United States Patent
Robinson

(10) Patent No.: US 10,323,408 B1
(45) Date of Patent: *Jun. 18, 2019

(54) DURABLE WATER AND FIRE-RESISTANT TUNNEL EXPANSION JOINT SEAL

(71) Applicant: Schul International Company, LLC, Pelham, NH (US)

(72) Inventor: Steven R. Robinson, Windham, NH (US)

(73) Assignee: Schul International Company, LLC, Pelham, NH (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/860,911

(22) Filed: Jan. 3, 2018

Related U.S. Application Data

(63) Continuation-in-part of application No. 15/714,390, filed on Sep. 25, 2017, now Pat. No. 10,000,921, which is a continuation of application No. 15/217,085, filed on Jul. 22, 2016, now Pat. No. 9,803,357.

(51) Int. Cl.
  *E04B 1/68* (2006.01)
  *E04B 1/94* (2006.01)
  *F16J 15/02* (2006.01)

(52) U.S. Cl.
  CPC .......... *E04B 1/6801* (2013.01); *E04B 1/6807* (2013.01); *E04B 1/948* (2013.01); *F16J 15/024* (2013.01); *E04B 2001/6818* (2013.01)

(58) Field of Classification Search
  CPC ..................................................... F16J 15/024
  See application file for complete search history.

(56) References Cited

U.S. PATENT DOCUMENTS

| | | | |
|---|---|---|---|
| 945,914 | A | 4/1909 | Colwell |
| 1,371,727 | A | 3/1921 | Blickle |
| 2,544,532 | A | 3/1951 | Hill |
| 2,995,056 | A | 10/1960 | Knox |
| 3,262,894 | A | 7/1966 | Green |
| 3,334,557 | A | 8/1967 | Fitzgibbon |
| 3,449,879 | A | 6/1969 | Bloom |
| 3,455,850 | A | 7/1969 | Saunders |
| 3,492,250 | A | 1/1970 | Deyrup |
| 3,527,009 | A | 9/1970 | Nyquist |

(Continued)

FOREIGN PATENT DOCUMENTS

| | | |
|---|---|---|
| CA | 1280007 | 2/1991 |
| CA | 1334268 | 2/1995 |

(Continued)

OTHER PUBLICATIONS

Hai Vo; Final Office Action for U.S. Appl. No. 14/630,125; dated May 13, 2016; 11 pages; USPTO; Alexandria, Virginia.

(Continued)

*Primary Examiner* — Gilbert Y Lee
(74) *Attorney, Agent, or Firm* — Crain, Caton & James, P.C.; James E. Hudson, III

(57) ABSTRACT

The present disclosure relates generally to systems for providing a durable water-resistant and fire-resistant foam-based seal in the joint between adjacent panels. A fire-resistant and water-resistant expansion joint seal is provided which includes one or more foam members and a plurality of intumescent members interspersed within the foam member or members to provide a spring recovery force and fire resistance.

32 Claims, 4 Drawing Sheets

(56) References Cited

U.S. PATENT DOCUMENTS

| | | |
|---|---|---|
| 3,712,188 A | 1/1973 | Worson |
| 3,772,220 A | 11/1973 | Porter et al. |
| 3,827,204 A | 8/1974 | Walters |
| 3,883,475 A | 5/1975 | Racky et al. |
| 4,018,539 A | 4/1977 | Puccio |
| 4,058,947 A | 11/1977 | Earle et al. |
| 4,134,875 A | 1/1979 | Tapia |
| 4,181,711 A | 1/1980 | Ohashi et al. |
| 4,224,374 A | 9/1980 | Priest |
| 4,237,182 A | 12/1980 | Fulmer et al. |
| 4,260,688 A | 4/1981 | Simon |
| 4,288,559 A | 9/1981 | Illger |
| 4,374,207 A | 2/1983 | Stone et al. |
| 4,401,716 A | 8/1983 | Tschudin-Mahrer |
| 4,455,396 A | 6/1984 | Al-Tabaqchall et al. |
| 4,565,550 A | 1/1986 | Dorer, Jr. et al. |
| 4,566,242 A | 1/1986 | Dunsworth |
| 4,654,550 A | 3/1987 | Lowther et al. |
| 4,767,655 A | 8/1988 | Tschudin-Mahrer |
| 4,839,223 A | 6/1989 | Tschudin-Mahrer |
| 4,922,676 A | 5/1990 | Sproken |
| 4,992,481 A | 2/1991 | von Bonin et al. |
| 5,000,813 A | 3/1991 | Hill |
| 5,006,564 A | 4/1991 | Noonenbruch et al. |
| 5,007,765 A | 4/1991 | Deitlein et al. |
| 5,130,176 A | 7/1992 | Baerveldt |
| 5,173,515 A | 12/1992 | von Bonin |
| 5,253,459 A | 10/1993 | Parinas et al. |
| 5,327,693 A | 7/1994 | Schmid |
| 5,335,466 A | 8/1994 | Langohr |
| 5,686,174 A | 7/1997 | Irrgeher |
| 5,744,199 A | 4/1998 | Joffre et al. |
| 5,765,332 A | 6/1998 | Landin et al. |
| 5,935,695 A | 8/1999 | Baerveldt |
| 6,039,503 A | 3/2000 | Cathey |
| 6,418,688 B1 | 7/2002 | Jones, Jr. |
| 6,532,708 B1 | 3/2003 | Baerveldt |
| 6,544,445 B1 | 4/2003 | Graf et al. |
| 6,666,618 B1 | 12/2003 | Anaya et al. |
| 6,685,196 B1 | 2/2004 | Baerveldt |
| 6,698,146 B2 | 3/2004 | Morgan et al. |
| 6,928,777 B2 | 8/2005 | Cordts |
| 8,317,444 B1 | 11/2012 | Hensley |
| 8,341,908 B1 | 1/2013 | Hensley et al. |
| 8,365,495 B1 | 2/2013 | Witherspoon |
| 8,590,231 B2 | 11/2013 | Pilz et al. |
| 8,595,999 B1 | 12/2013 | Pilz et al. |
| 8,720,138 B2 | 5/2014 | Hilburn, Jr. |
| 8,739,495 B1 | 6/2014 | Witherspoon |
| 8,813,449 B1 | 8/2014 | Hensley et al. |
| 8,813,450 B1 | 8/2014 | Hensley et al. |
| 8,870,506 B2 | 10/2014 | Hensley et al. |
| 8,935,897 B2 | 1/2015 | Shaw |
| 9,045,899 B2 | 6/2015 | Pilz et al. |
| 9,068,297 B2 | 6/2015 | Hensley et al. |
| 9,200,437 B1 | 12/2015 | Hensley et al. |
| 9,206,596 B1 | 12/2015 | Robinson |
| 9,322,163 B1 | 4/2016 | Hensley |
| 9,404,581 B1 | 8/2016 | Robinson |
| 9,528,262 B2 | 12/2016 | Witherspoon |
| 9,631,362 B2 | 4/2017 | Hensley et al. |
| 9,637,915 B1 | 5/2017 | Hensley et al. |
| 9,644,368 B1 | 5/2017 | Witherspoon |
| 9,670,666 B1 | 6/2017 | Witherspoon et al. |
| 9,677,299 B2 | 6/2017 | Whiteley |
| 9,689,157 B1 | 6/2017 | Hensley et al. |
| 9,689,158 B1 | 6/2017 | Hensley et al. |
| 9,719,248 B1 | 8/2017 | Meacham |
| 9,732,853 B2 | 8/2017 | Kethorn et al. |
| 9,739,049 B1 | 8/2017 | Robinson |
| 9,739,050 B1 | 8/2017 | Hensley et al. |
| 9,745,738 B2 | 8/2017 | Robinson |
| 9,765,486 B1 | 9/2017 | Robinson |
| 9,803,357 B1 | 10/2017 | Robinson |
| 9,840,814 B2 | 12/2017 | Robinson |
| 9,850,662 B2 | 12/2017 | Hensley |
| 9,856,641 B2 | 1/2018 | Robinson |
| 9,915,038 B2 | 3/2018 | Robinson |
| 9,951,515 B2 | 5/2018 | Robinson |
| 9,963,872 B2 | 5/2018 | Hensley et al. |
| 9,982,428 B2 | 5/2018 | Robinson |
| 9,982,429 B2 | 5/2018 | Robinson |
| 2003/0005657 A1 | 1/2003 | Visser et al. |
| 2003/0110723 A1 | 6/2003 | Baerveldt |
| 2004/0035075 A1 | 2/2004 | Trout |
| 2004/0093815 A1 | 5/2004 | Cordts |
| 2005/0034389 A1 | 2/2005 | Boot |
| 2005/0126848 A1 | 6/2005 | Siavoshai |
| 2006/0053710 A1 | 3/2006 | Miller et al. |
| 2006/0117692 A1 | 6/2006 | Trout |
| 2007/0059516 A1 | 3/2007 | Vincent et al. |
| 2008/0172967 A1 | 7/2008 | Hilburn |
| 2008/0268231 A1 | 10/2008 | Deib |
| 2010/0275539 A1 | 11/2010 | Shaw |
| 2010/0304078 A1 | 12/2010 | Stol |
| 2012/0022176 A1 | 1/2012 | Stahl et al. |
| 2012/0023846 A1 | 2/2012 | Mattox et al. |
| 2012/0117900 A1 | 5/2012 | Shaw |
| 2013/0055667 A1 | 3/2013 | Beele |
| 2014/0219719 A1 | 8/2014 | Hensley et al. |
| 2014/0360118 A1 | 12/2014 | Hensley et al. |
| 2015/0068139 A1 | 3/2015 | Witherspoon |
| 2015/0337530 A1 | 11/2015 | Pilz et al. |
| 2017/0130450 A1 | 5/2017 | Witherspoon |
| 2017/0159817 A1 | 6/2017 | Robinson |
| 2017/0191256 A1 | 7/2017 | Robinson |
| 2017/0226733 A1 | 8/2017 | Hensley et al. |
| 2017/0241132 A1 | 8/2017 | Witherspoon |
| 2017/0254027 A1 | 9/2017 | Robinson |
| 2017/0268222 A1 | 9/2017 | Witherspoon et al. |
| 2017/0292262 A1 | 10/2017 | Hensley et al. |
| 2017/0298618 A1 | 10/2017 | Hensley et al. |
| 2017/0314213 A1 | 11/2017 | Robinson |
| 2017/0314258 A1 | 11/2017 | Robinson |
| 2017/0342665 A1 | 11/2017 | Robinson |
| 2017/0342708 A1 | 11/2017 | Hensley et al. |
| 2017/0370094 A1 | 12/2017 | Robinson |
| 2018/0002868 A1 | 1/2018 | Robinson |
| 2018/0016784 A1 | 1/2018 | Hensley et al. |
| 2018/0038095 A1 | 2/2018 | Robinson |
| 2018/0106001 A1 | 4/2018 | Robinson |
| 2018/0106032 A1 | 4/2018 | Robinson |
| 2018/0119366 A1 | 5/2018 | Robinson |
| 2018/0142465 A1 | 5/2018 | Robinson |
| 2018/0148922 A1 | 5/2018 | Robinson |

FOREIGN PATENT DOCUMENTS

| | | |
|---|---|---|
| CA | 2296779 | 11/2006 |
| DE | 4436280 A1 | 2/1996 |
| DE | 102005054375 A1 | 5/2007 |
| EP | 0942107 A2 | 9/1999 |
| EP | 1118715 B1 | 10/2004 |
| EP | 1540220 | 3/2006 |
| EP | 1983119 A1 | 4/2007 |
| GB | 977929 | 12/1964 |
| GB | 1359734 | 7/1974 |
| GB | 1495721 | 12/1977 |
| GB | 1519795 | 8/1978 |
| GB | 2251623 A1 | 7/1992 |
| GB | 2359265 A1 | 8/2001 |
| WO | 03006109 | 1/2003 |
| WO | 2003066766 A1 | 8/2003 |
| WO | 2007023118 A2 | 3/2007 |
| WO | 2006127533 A1 | 11/2009 |

OTHER PUBLICATIONS

Hai Vo; Non-Final Office Action for U.S. Appl. No. 14/630,125; dated Feb. 8, 2016; 8 pages; USPTO; Alexandria, Virginia.

Hai Vo; Notice of Allowance for U.S. Appl. No. 14/630,125; dated Jun. 14, 2016; 12 pages; USPTO; Alexandria, Virginia.

(56) References Cited

OTHER PUBLICATIONS

Beth A. Stephan; Notice of Allowance for U.S. Appl. No. 14/643,031; dated Oct. 28, 2015; 8 pages; USPTO; Alexandria, Virginia.
Paola Agudelo; Final Office Action for U.S. Appl. No. 15/046,924; dated May 10, 2017; 13 pages; USPTO; Alexandria, Virginia.
Paola Agudelo; Non-Final Office Action for U.S. Appl. No. 15/046,924; dated Dec. 12, 2016; 12 pages; USPTO; Alexandria, Virginia.
Paola Agudelo; Notice of Allowance for U.S. Appl. No. 15/046,924; dated Jul. 6, 2017; 7 pages; USPTO; Alexandria, Virginia.
Gilbert Y. Lee; Notice of Allowance for U.S. Appl. No. 15/217,085; dated Sep. 13, 2017; 8 pages; USPTO; Alexandria, Virginia.
Paola Agudelo; Non-Final Office Action for U.S. Appl. No. 15/648,908; dated Oct. 4, 2017; 11 pages; USPTO; Alexandria, Virginia.
Paola Agudelo; Notice of Allowance for U.S. Appl. No. 15/648,908; dated Oct. 27, 2017; 8 pages; USPTO; Alexandria, Virginia.
Gilbert Y. Lee; Notice of Allowance for U.S. Appl. No. 15/649,927; dated Nov. 8, 2017; 7 pages; USPTO; Alexandria, Virginia.
Gilbert Y. Lee; Notice of Allowance for U.S. Appl. No. 15/677,811; dated Nov. 28, 2017; 7 pages; USPTO; Alexandria, Virginia.
Beth A. Stephan; Non-Final Office Action for U.S. Appl. No. 15/681,500; dated Jan. 5, 2018; 10 pages; USPTO; Alexandria, Virginia.
John Nguyen; International Preliminary Report on Patentability for PCT Application No. PCT/US16/19059; dated May 30, 2017; 6 pages; USPTO as IPEA; Alexandria, Virginia.
Shane Thomas; International Search Report and Written Opinion for PCT Application No. PCT/US16/19059; dated May 20, 2016; 7 pages; USPTO as ISA; Alexandria, Virginia.
Harry C. Kim; International Preliminary Report on Patentability for PCT Application No. PCT/US16/66495; dated Jan. 18, 2018; 8 pages; USPTO as IPEA; Alexandria, Virginia.
Shane Thomas; International Search Report and Written Opinion for PCT Application No. PCT/US16/66495; dated Feb. 27, 2017; 7 pages; USPTO as ISA; Alexandria, Virginia.
Shane Thomas; International Search Report and Written Opinion for PCT Application No. PCT/US17/17132; dated May 4, 2017; 6 pages; USPTO as ISA; Alexandria, Virginia.
Adolf Wurth GmbH & Co. KG; 81 Elastic Joint Sealing Tape; retrieved Aug. 5, 2005; 4 pages.
Amber Composites; Expanding PU Foam Technical Data Sheet (Premier BG1); Feb. 1997; 2 pages.
ASTM International; ASTM E84-04; 2004; 19 pages.
ASTM International; Designation E 176-07 Standard Terminology of Fire Standards; 2007; 20 pages.
ASTM International; Standard Terminology of Fire Standards; Nov. 11, 2014; 20 pages.
Auburn Manufacturing Company; Auburn Product News—R-10400M; Dec. 2007; 1 page.
AWCI Construction Dimensions; Where's the Beef in Joint Sealants? Hybrids Hold the Key by Lester Hensley; Jan. 2006 3 pages.
British Board of Agrement; Compriband 600 Sealing Tapes—Certificate 96/3309; Jul. 14, 2005; 8 page.
British Board of Agrement; Compriband Super—Certificate 97/3331; Aug. 2, 2005; 4 pages.
British Board of Agrement; Illmod 600 Sealing Tapes; Mar. 26, 2003; 8 pages.
British Standards Institute; Translation—NEN 6069; Oct. 1991; 31 pages.
British Standards Institution; Fire tests on building materials and structures (BS476:Part 20); 1987; 44 pages.
Building and Engineering Standards Committee; Impregnated cellular plastics strips for sealing external joints—DIN 18542; Jan. 1999; 10 pages.
BuildingTalk; Choosing a sealant for building applications by Lester Hensley CEO and President of Emseal; May 21, 2007; 6 pages.
Centre for Fire Research; Determination of the Fire Resistance According to NEN 6069 of Joints in a Wall Sealed with Cocoband 6069 Impregnated Foam Strip; Nov. 1996; 19 pages.
DIN ev; Fire behavior of building materials and building components; Sep. 1977; 11 pages.
DIN ev; Fire behavior of building materials and building components; May 1998; 33 pages.
DIN ev; Fire behavior of building materials and elements; Mar. 1994; 144 pages.
Dow Corning; Dow Corning 790 Silicone Building Sealant; 1999; 8 pages.
Dow Corning; Dow Corning 790 Silicone Building Sealant; 2000; 6 pages.
Dow Corning; Dow Corning 790 Silicone Building Sealant; 2004; 4 pages.
Dow Corning; Dow Corning Firestop 400 Silicone Sealant; Jan. 15, 2001; 4 pages.
Dow Corning; Dow Corning Firestop 700 Silicone Sealant; Jan. 15, 2001; 6 pages.
Emseal Joint Systems Ltd.; Horizontal Colorseal Aug. 2000 2 pages.
Emseal Joint Systems Ltd.; Colorseal PC/SA Stick; 1 page; Jun. 7, 1995.
Emseal Joint Systems Ltd.; SJS-100-CHT-RN; 1 page; Nov. 20, 2007.
Emseal Joint Systems Ltd; 20H System Tech Data; Jun. 1997; 2 pages.
Emseal Joint Systems Ltd; Colorseal Aug. 2000 2 pages.
Emseal Joint Systems Ltd; DSH System; Nov. 2005; 2 pages.
Emseal Joint Systems Ltd; Fire-Rating of Emseal 20H System; Author of "LH"; Feb. 17, 1993/Apr. 18, 1993; 2 pages.
Emseal Joint Systems Ltd; Horizontal Colorseal Tech Data; Jun. 1997; 2 pages.
Emseal Joint Systems Ltd; Preformed Sealants and Expansion Joint Systems; May 2002, 4 pages.
Emseal Joint Systems Ltd; Preformed Sealants and Expansion Joints.; Jan. 2002; 4 pages.
Emseal Joint Systems Ltd; Seismic Colorseal; Apr. 1998; 2 pages.
Emseal Joint Systems; Seismic Colorseal; Aug. 2000; 2 pages.
Emseal; Benchmarks of Performance for High Movement Acrylic-Impregnated Precompressed Foam Sealants; Aug. 21, 2007; 7 pages.
Emseal; Seismic Colorseal-DS (Double Sided); Apr. 12, 2007; 4 pages.
Envirograf; Fire Kills; 2004; 8 pages available by at least Nov. 10, 2006 per Archive.org.
Fire Retardants Inc.; Fire Barrier CP 25WB + Caulk; 2002; 4 pages.
IBMB; Test 3002/2719—Blocostop F120; Mar. 24, 2000; 14 pages.
IBMB; Test 326315362—Firestop N; Jul. 18, 2002; 13 pages.
IBMB; Test 356812560; Sep. 30, 2005; 14 pages.
IFT Rosenheim; Evidence of Performance—Test Report 105 32469/1e U R1; Apr. 19, 2006; 8 pages.
Illbruck Bau-Produkte GmbH u Co. KG; Willseal Firestop; Sep. 30, 1995; 2 pages.
Illbruck Inc.; Will-Seal 250 Spec Data; Aug. 1989; 2 pages.
Illbruck International; willseal the joint sealing tape; Jan. 1991; 19 pages.
Illbruck Sealant Systems inc..; Illbruck Willseal 600; Sep. 2001; 2 pages.
Illbruck USA; MSDS—Willseal 150/250 and/or EPS; Jul. 21, 1986; 2 pages.
Illbruck/USA; Will-Seal 150 Spec Data; Nov. 1987; 2 pages.
Iso Chemie GmbH; Iso-Bloco 600; 2 pages; Jul. 1, 2006.
Stephan, Beth A; Non-Final Office Action for U.S. Appl. No. 15/681,500; dated Mar. 20, 2018; 7 pages; USPTO; Alexandria, Virginia.
Agudelo, Paola; Non-Final Office Action for U.S. Appl. No. 15/885,028; dated Mar. 30, 2018; 7 pages; USPTO; Alexandria, Virginia.
20H System Tech Data, Jun. 1997, 2 pages, Emseal Joint Systems, Ltd., USA.
Horizontal Colorseal Tech Data, Jun. 1997, 2 pages, Emseal Joint Systems, Ltd.
Emseal Acrylic Log Home Tape Installation Instructions, Jun. 2011, 1 page, Emseal Joint Systems, Ltd., retrieved on Mar. 30, 2016 from https://web.archive.org/web/20160330181621/http://www.emseal.com/Products-/Specialty/LogHome/AcrylicLogHome.sub.-Tapes.sub.--Install.sub.--X.pdf.

(56) References Cited

OTHER PUBLICATIONS

Emseal BEJS System—Bridge Expansion Joint System, May 26, 2010, 5 pages, Emseal Joint Systems, Ltd., retrieved on Mar. 30, 2016 from https://web.archive.org/web/20100526081854/http://www.emseal.com/products-/Infrastructure/BridgeJointSeals/BEJSBridgeJointSystem.htm.
Dow Coming 890-SL Self-Leveling Silicone Joint Sealant, 2005, 4 pages, USA.
Install Data—Horizontal Colorseal—with Epoxy Adhesive, Jun. 1997, 2 pages, Emseal Joint Systems, Ltd., USA.
Sackerseal (Greyflex), Sep. 2001, 2 pages, Emseal Joint Systems, Ltd., USA.
Emseal Emshield DFR2 System DFR3 System Tech Data, May 2010, 4 pages, Emseal Joint Systems, Ltd., USA.
Seismic Colorseal by Emseal, Aug. 21, 2007, 4 pages, Emseal Corporation, USA.
Universal 90's, Aug. 4, 2009, 4 pages, Emseal Joint Systems, Ltd., USA.
Specified Technologies, Inc.; Product Data Sheet PEN200 Silicone Foam; 2003; 2 pages.
Specified Technologies, Inc.; Product Data Sheet SpecSeal Series ES Elastomeric Sealant; 2004; 4 pages.
Specified Technologies, Inc.; Product Data Sheet SpecSeal Series ES Elastomeric Sealant; 2000; 4 pages.
Specified Technologies, Inc.; Product Data Sheet PEN300 Silicone Foam; 2004; 4 pages.
Specified Technologies, Inc.; Firestop Submittal Package; 2004; 37 pages.
XHBN Joint Systems Data Sheet (retrieved Sep. 6, 2017 from http://database.ul.com/cgi-bin/XYV/template/LISEXT/1FRAME/showpage.html?name=XHBN.WW-D-0109&ccnshorttitle=Joint+Systems&objid=1082471571&cfgid=1073741824&version=versionless&parent_id=1073995560&sequence=1).
"Protecting the Foundation of Fire-safety" by Robert Berhinig, P.E. (IAEI News, Jul./Aug. 2002).
"Thermaflex Parking Deck Expansion Joint", Emseal (retrieved from https://www.emseal.com/product/thermaflex-parking-deck-expansion-joint/).
"Jeene—Bridge Series", BASF (retrieved from https://wbacorp.com/products/bridge-highway/joint-seals/jeene-bridge).
UL LLC, System No. WW-D-1148, UL Online Certifications Directory, Jul. 22, 2015, retrieved Sep. 5, 2017 from http://database.ul.com/cgi-bin/XYV/template/LISEXT/1FRAME/showpage.html?name=XHBN.WW-D-1148&ccnshorttitle=Joint+Systems&objid=1083778206&cfgid=1073741824&version=versionless&parent_id=1073995560&sequence=1, 1 page, Northbrook, Illinois.
UL LLC, System No. WW-D-1173, UL Online Certifications Directory, May 12, 2015, retrieved Sep. 5, 2017 from http://database.ul.com/cgi-bin/XYV/template/LISEXT/1FRAME/showpage.html?name=XHBN.WW-D-1173&ccnshorttitle=Joint+Systems&objid=1084832391&cfgid=1073741824&version=versionless&parent_id=1073995560&sequence=1, 1 page, Northbrook, Illinois.
UL LLC, System No. WW-D-1148 for Canada, UL Online Certifications Directory, Jul. 22, 2015, retrieved Sep. 5, 2017 from http://database.ul.com/cgi-bin/XYV/template/LISEXT/1FRAME/showpage.html?name=XHBN7.WW-D-1148&ccnshorttitle=Joint+Systems+Certified+for+Canada&objid=1083778211&cfgid=1073741824&version=versionless&parent_id=1073995562&sequence=1, 1 page, Northbrook, Illinois.
UL LLC, System No. WW-D-1173, UL Online Certifications Directory, May 12, 2015, retrieved Sep. 5, 2017 from http://database.ul.com/cgi-bin/XYV/template/LISEXT/1FRAME/showpage.html?name=XHBN7.WW-D-1173&ccnshorttitle=Joint+Systems+Certified+for+Canada&objid=1084832396&cfgid=1073741824&version=versionless&parent_id=1073995562&sequence=1, 1 page, Northbrook, Illinois.
Balco, Inc, CE Series Expansion Joint Seals with METABLOCK. Sep. 28, 2015, retrieved Sep. 5, 2017f rom https://balcousa.com/metablock-ce-fire-barrier-2/, 1 page, Wichita, Kansas, USA.
Hai Vo; Final Office Action for U.S. Appl. No. 15/189,671; dated May 31, 2018; 14 pages; USPTO; Alexandria, Virginia.
Harry Kim; International Preliminary Report on Patentability for PCT Application No. PCT/US17/17132; dated Feb 6, 2018; 6 pages; USPTO as IPEA; Alexandria, Virginia.
Hai Vo; Non-Final Office Action for U.S. Appl. No. 15/189,671; dated Mar. 7, 2018; 17 pages; USPTO; Alexandria, Virginia.
UFP Technologies; Polyethylene Foam Material; Dated Jan 8, 2012; retrieved from https://web.archive.org/web/20120108003656/http://www.ufpt.com:80/materials/foam/polyethylene-foam.html on Mar. 7, 2018; 1 page.
Stephan, Beth A.; Non-Final Office Action for U.S. Appl. No. 15/884,553; dated Mar. 7, 2018; 7 pages; USPTO; Alexandria, Virginia.
UL, LLC; Online Certifications Directory; "System No. WW-D-1092, XHBN.WW-D-1092 Joint Systems"; Sep. 24, 2012; retrieved on Feb. 1, 2018 from http://database.ul.com/cgi-bin/XYV/template/LISEXT/1FRAME/showpage.html?name=XHBN.WW-D-1092&ccnshorttitle=Joint+Systems&objid=1082471646&cfgid=1073741824&version=versionless&parent_id=1073995560&sequence=1; 2 pages.
UL, LLC; Online Certifications Directory; "System No. WW-D-1093, XHBN.WW-D-1093 Joint Systems";Oct. 6, 2014; retrieved on Feb. 1, 2018 from http://database.ul.com/cgi-bin/XYV/template/LISEXT/1FRAME/showpage.html?name=XHBN.WW-D-1093&ccnshorttitle=Joint+Systems&objid=1082823956&cfgid=1073741824&version=versionless&parent_id=1073995560&sequence=1; 3 pages.
UL, LLC; Online Certifications Directory; "System No. HW-D-1098, XHBN.HW-D-1098 Joint Systems"; Jun. 6, 2013; retrieved on Feb. 1, 2018 from http://database.ul.com/cgi-bin/XYV/template/LISEXT/1FRAME/showpage.html?name=XHBN.HW-D-1098&ccnshorttitle=Joint+Systems&objid=1082700131&cfgid=1073741824&version=versionless&parent_id=1073995560&sequence=1; 3 pages.
UL, LLC; Online Certifications Directory; "System No. FF-D-1100, XHBN.FF-D-1100 Joint Systems"; Sep. 24, 2012; retrieved on Feb. 1, 2018 from http://database.ul.com/cgi-bin/XYV/template/LISEXT/1FRAME/showpage.html?name=XHBN.FF-D-1100&ccnshorttitle=Joint+Systems&objid=1082567162&cfgid=1073741824&version=versionless&parent_id=1073995560&sequence=1; 2 pages.
UL, LLC; Online Certifications Directory; "System No. WW-D-1101, XHBN.WW-D-1101 Joint Systems"; Oct. 6, 2014; retrieved on Feb. 1, 2018 from http://database.ul.com/cgi-bin/XYV/template/LISEXT/1FRAME/showpage.html?name=XHBN.WW-D-1101&ccnshorttitle=Joint+Systems&objid=1082823966&cfgid=1073741824&version=versionless&parent_id=1073995560&sequence=1; 2 pages.
UL, LLC; Online Certifications Directory; "System No. WW-D-1102, XHBN.WW-D-1102 Joint Systems"; Sep. 24, 2012; retrieved on Feb. 1, 2018 from http://database.ul.com/cgi-bin/XYV/template/LISEXT/1FRAME/showpage.html?name=XHBN.WW-D-1102&ccnshorttitle=Joint+Systems&objid=1082699876&cfgid=1073741824&version=versionless&parent_id=1073995560&sequence=1; 2 pages.
UL, LLC; Online Certifications Directory; "System No. FF-D-1109, XHBN.FF-D-1109 Joint Systems"; Jul. 29, 2013; retrieved on Feb. 1, 2018 from http://database.ul.com/cgi-bin/XYV/template/LISEXT/1FRAME/showpage.html?name=XHBN.FF-D-1109&ccnshorttitle=Joint+Systems&objid=1082845106&cfgid=1073741824&version=versionless&parent_id=1073995560&sequence=1; 2 pages.
UL, LLC; Online Certifications Directory; "System No. FF-D-1110, XHBN.FF-D-1110 Joint Systems"; Nov. 1, 2013; retrieved on Feb. 1, 2018 from http://database.ul.com/cgi-bin/XYV/template/LISEXT/1FRAME/showpage.html?name=XHBN.FF-D-1110&ccnshorttitle=Joint+Systems&objid=1082845102&cfgid=1073741824&version=versionless&parent_id=1073995560&sequence=1; 2 pages.
UL, LLC; Online Certifications Directory; "System No. WW-D-1119, XHBN.WW-D-1119 Joint Systems"; Jul. 29, 2013; retrieved on Feb. 1, 2018 from http://database.ul.com/cgi-bin/XYV/template/LISEXT/1FRAME/showpage.html?name=XHBN.WW-D-1119&ccnshorttitle=Joint+Systems&objid=1083149741&cfgid=1073741824&version=versionless&parent_id=1073995560&sequence=1; 3 pages.
UL, LLC; Online Certifications Directory; "System No. WW-D-1120, XHBN.WW-D-1120 Joint Systems"; Jun. 6, 2013; retrieved on Feb. 1, 2018 from http://database.ul.com/cgi-bin/XYV/template/LISEXT/1FRAME/showpage.html?name=XHBN.WW-D-1120

(56) References Cited

OTHER PUBLICATIONS

&ccnshorttitle=Joint+Systems&objid=1083149707&cfgid=1073741824&version=versionless&parent_id=1073995560&sequence=1; 2 pages.
UL, LLC; Online Certifications Directory; "System No. FF-D-1148, XHBN.FF-D-1148 Joint Systems"; May 15, 2014; retrieved on Feb. 1, 2018 from http://database.ul.com/cgi-bin/XYV/template/LISEXT/1FRAME/showpage.html?name=XHBN.FF-D-1148&ccnshorttitle=Joint+Systems&objid=1084034211&cfgid=1073741824&version=versionless&parent_id=1073995560&sequence=1; 2 pages.
UL, LLC Online Certifications Directory; "System No. WW-D-1152, XHBN.WW-D-1152 Joint Systems"; Aug. 14, 2014; retrieved on Feb. 1, 2018 from http://database.ul.com/cgi-bin/XYV/template/LISEXT/1FRAME/showpage.html?name=XHBN.WW-D-1152&ccnshorttitle=Joint+Systems&objid=1084034221&cfgid=1073741824&version=versionless&parent_id=1073995560&sequence=1; 2 pages.
UL, LLC; Online Certifications Directory; "System No. WW-D-1153, XHBN.WW-D-1153 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1153&ccnshorttitle=Joint+Systems&objid=1084052791&cfgid=1073741824&version=versionless&parent_id=1073995560&sequence=1; 2 pages.
UL, LLC; Online Certifications Directory; "System No. WW-D-1154, XHBN.WW-D-1154 Joint Systems"; Jun. 16, 2014; retrieved on Feb. 1, 2018 from http://database.ul.com/cgi-bin/XYV/template/LISEXT/1FRAME/showpage.html?name=XHBN.WW-D-1154&ccnshorttitle=Joint+Systems&objid=1084052801&cfgid=1073741824&version=versionless&parent_id=1073995560&sequence=1; 2 pages.
UL, LLC; Online Certifications Directory; "System No. FF-D-1156, XHBN.FF-D-1156 Joint Systems"; Nov. 9, 2015; retrieved on Feb. 1, 2018 from http://database.ul.com/cgi-bin/XYV/template/LISEXT/1FRAME/showpage.html?name=XHBN.FF-D-1156&ccnshorttitle=Joint+Systems&objid=1085235671&cfgid=1073741824&version=versionless&parent_id=1073995560&sequence=1; 2 pages.
UL, LLC; Online Certifications Directory; "System No. FF-D-1157, XHBN.FF-D-1157 Joint Systems"; Nov. 9, 2015; retrieved on Feb. 1, 2018 from http://database.ul.com/cgi-bin/XYV/template/LISEXT/1FRAME/showpage.html?name=XHBN.FF-D-1157&ccnshorttitle=Joint+Systems&objid=1085235726&cfgid=1073741824&version=versionless&parent_id=1073995560&sequence=1; 2 pages.
Schul International; Firejoint 2FR-H & Firejoint 3FR-H; 2012; 2 pages.
Schul International; Firejoint 2FR-V & Firejoint 3FR-V; 2012; 2 pages.
UL, LLC; Online Certifications Directory; "System No. HW-D-1101, XHBN.HW-D-1101 Joint Systems"; Sep. 11, 2013; retrieved on Feb. 1, 2018 from http://database.ul.com/cgi-bin/XYV/template/LISEXT/1FRAME/showpage.html?name=XHBN.HW-D-1101&ccnshorttitle=Joint+Systems&objid=1083156306&cfgid=1073741824&version=versionless&parent_id=1073995560&sequence=1; 3 pages.
UL, LLC; Online Certifications Directory; "System No. FF-D-1121, XHBN.FF-D-1121 Joint Systems"; Apr. 25, 2013; retrieved on Feb. 1, 2018 from http://database.ul.com/cgi-bin/XYV/template/LISEXT/1FRAME/showpage.html?name=XHBN.FF-D-1121&ccnshorttitle=Joint+Systems&objid=1083156406&cfgid=1073741824&version=versionless&parent_id=1073995560&sequence=1; 2 pages.
UL, LLC; Online Certifications Directory; "System No. FF-D-1122, XHBN.FF-D-1122 Joint Systems"; Sep. 11, 2013; retrieved on Feb. 1, 2018 from http://database.ul.com/cgi-bin/XYV/template/LISEXT/1FRAME/showpage.html?name=XHBN.FF-D-1122&ccnshorttitle=Joint+Systems&objid=1083156361&cfgid=1073741824&version=versionless&parent_id=1073995560&sequence=1; 2 pages.
UL, LLC; Online Certifications Directory; "System No. FF-D-1123, XHBN.FF-D-1123 Joint Systems"; Sep. 11, 2013; retrieved on Feb. 1, 2018 from http://database.ul.com/cgi-bin/XYV/template/LISEXT/1FRAME/showpage.html?name=XHBN.FF-D-1123&ccnshorttitle=Joint+Systems&objid=1083156331&cfgid=1073741824&version=versionless&parent_id=1073995560&sequence=1; 2 pages.
UL, LLC; Online Certifications Directory; "System No. WW-D-1124, XHBN.WW-D-1124 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1124&ccnshorttitle=Joint+Systems&objid=1083156186&cfgid=1073741824&version=versionless&parent_id=1073995560&sequence=1; 2 pages.
UL, LLC; Online Certifications Directory; "System No. WW-D-1125, XHBN.WW-D-1125 Joint Systems"; Apr. 25, 2013; retrieved on Feb. 1, 2018 from http://database.ul.com/cgi-bin/XYV/template/LISEXT/1FRAME/showpage.html?name=XHBN.WW-D-1125&ccnshorttitle=Joint+Systems&objid=1083156176&cfgid=1073741824&version=versionless&parent_id=1073995560&sequence=1; 2 pages.
UL, LLC; Online Certifications Directory; "System No. WW-D-1126, XHBN.WW-D-1126 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1126&ccnshorttitle=Joint+Systems&objid=1083156461&cfgid=1073741824&version=versionless&parent_id=1073995560&sequence=1; 2 pages.
UL, LLC; Online Certifications Directory; "System No. WW-D-1127, XHBN.WW-D-1127 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1127&ccnshorttitle=Joint+Systems&objid=1083156441&cfgid=1073741824&version=versionless&parent_id=1073995560&sequence=1; 3 pages.
UL, LLC; Online Certifications Directory; "System No. FF-D-1151, XHBN.FF-D-1151 Joint Systems"; Aug. 20, 2014; retrieved on Feb. 1, 2018 from http://database.ul.com/cgi-bin/XYV/template/LISEXT/1FRAME/showpage.html?name=XHBN.FF-D-1151&ccnshorttitle=Joint+Systems&objid=1084241891&cfgid=1073741824&version=versionless&parent_id=1073995560&sequence=1; 2 pages.
UL, LLC; Online Certifications Directory; "System No. WW-D-1160, XHBN.WW-D-1160 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1160&ccnshorttitle=Joint+Systems&objid=1084241902&cfgid=1073741824&version=versionless&parent_id=1073995560&sequence=1; 2 pages.
UL, LLC; Online Certifications Directory; "System No. WW-D-1161, XHBN.WW-D-1161 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1161&ccnshorttitle=Joint+Systems&objid=1084241911&cfgid=1073741824&version=versionless&parent_id=1073995560&sequence=1; 3 pages.
UL, LLC; Online Certifications Directory; "System No. WW-D-1162, XHBN.WW-D-1162 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1162&ccnshorttitle=Joint+Systems&objid=1084241921&cfgid=1073741824&version=versionless&parent_id=1073995560&sequence=1; 2 pages.
UL, LLC; Online Certifications Directory; "System No. FF-D-1174, XHBN.FF-D-1174 Joint Systems"; Jul. 11, 2016; retrieved on Feb. 1, 2018 from http://database.ul.com/cgi-bin/XYV/template/LISEXT/1FRAME/showpage.html?name=XHBN.FF-D-1174&ccnshorttitle=Joint+Systems&objid=1085930212&cfgid=1073741824&version=versionless&parent_id=1073995560&sequence=1; 2 pages.
UL, LLC; Online Certifications Directory; "System No. FF-D-1175, XHBN.FF-D-1175 Joint Systems"; Jul. 12, 2016; retrieved on Feb. 1, 2018 from http://database.ul.com/cgi-bin/XYV/template/LISEXT/1FRAME/showpage.html?name=XHBN.FF-D-1175&ccnshorttitle=Joint+Systems&objid=1085930226&cfgid=1073741824&version=versionless&parent_id=1073995560&sequence=1; 2 pages.
Willseal, LLC; Willseal FR-2V; Mar. 4, 2013; 6 pages.
Willseal, LLC; Willseal FR-2H; Mar. 4, 2013; 6 pages.
Willseal, LLC; Willseal FR-V; dated 2013; 6 pages.
Willseal, LLC; Willseal FR-H; dated 2013; 6 pages.
Schul International Company, LLC; Firejoint 2FR-H & Firejoint 2FR-V; Aug. 2014; 3 pages.
Willseal, LLC; Willseal FR-2H & Willseal FR-2V; Mar. 4, 2013; 3 pages.
Willseal LLC; Willseal FR-H / Willseal FR-V; Oct. 2016; retrieved on Feb. 2, 2018 from https://willseal.com/wp-content/uploads/2016/10/WillsealFR_Install.pdf; 3 pages.
Schul International Company, LLC; Sealtite 50N; May 9, 2007; 2 pages.
Schul International Company, LLC; Seismic Sealtite; May 9, 2007; 2 pages.

(56) References Cited

OTHER PUBLICATIONS

Willseal LLC; MSDS for Willseal FR-V & FR-H; Jul. 19, 2013; 11 pages.
Schul International Company, LLC; Firejoint 2FR-V +50; dated 2012; 2 pages.
Stein et al. "Chlorinated Paraffins as Effective Low Cost Flame Retardants for Polyethylene" Dover Chemical Company Feb. 2003, 9 pages.
Hlilti, Inc.; Firestop Board (CP 675T); 1 page; Apr 2, 2007 (date shown in Google search: https://www.google.com/search?q=hilti+cp+675&source=Int&tbs=cdr%3A1%2Ccd_min%3A1%2F1%2F1900%2Ccd_max%3A12%2F31%2F2009&tbm).
Sandell Manufacturing Company, Inc.; Polyseal Precompressed Joint Sealant; 2 pages; Available by Jan. 31, 2000.
Advanced Urethane Technologies; Polyurethane Foam Specification Sheet; 1 page; Apr. 1, 2007.
American Institute of Architects, Masterspec, Feb. 1997.
Bonsignore, P.V.; Alumina Trihydrate as a Flame Retardant for Polyurethane Foams; Journal of Cellular Plastics, 174 (4): 220-225; Jul./Aug. 1981; 6 pages.
Bonsignore, P.V.; Flame Retardant Flexible Polyurethane Foam by Post-Treatment with Alumina Trihydrate/latex Binder Dispersion Systems;Journal of Cellular Plastics; May-Jun. 1979, pp. 163-179, 17 pages.
Dow Corning USA; Letter of Oct. 4, 1984 to Emseal USA, Inc.; 1 page; Oct. 4, 1984.
Emseal Corporation; Emseal Emseal GreyFlex SpecData; 1984; 4 pages.
Emseal Joint System, Ltd.; 25V; Apr. 1996; 2 pages.
Emseal Joint Systems, Ltd.; Colorseal Tech Data; 2 pages; Feb. 1991.
Emseal Joint System, Ltd.; Colorseal TechData; Jan. 2000.
Emseal Joint Systems, Ltd.; Colorseal in EIFS Application Focus; May 1997; 2 pages.
Emseal Joint Systems, Ltd.; Greyflex Expanding Foam Sealant; Feb. 1992.
Emseal Joint Systems, Ltd.; Greyflex Tech Data; Apr. 1996.
Emseal Joint Systems, Ltd.; The Complete Package for All Joint Requirements; 6 pages; 1988.
Corporation; Research and Development at Emseal; Jun. 27, 2007; 2 pages.
Envirograf; Product 40: Intumescent-Coated Fireproof Sponge (Patented); Apr. 8, 2007, 2 pages.
Hilti Construction Chemicals, Inc.; CP 604 Flexible Firestop Sealant; 1 page; 2005.
Hilti Construction Chemicals, Inc.; CP 606 Flexible Firestop Sealant; 5 pages; Apr. 25, 2000.
Hilti, Inc.; Firestop Board (CP 675T); undated; 1 page.
Hilti Firestop Systems; Untitled; 3 pages; Aug. 2013.
Hilti, Inc; FS 657 Product Information, Material Safety Data Sheet, and UL Certificate of Compliance; 4 pages; Feb. 14, 2006.
Hilti Inc.; Material Data Safety Sheet FS 657 Fire Block; CP 658T Firestop Plug; 2 pages; Mar. 1, 2005.
Illbruck Construction Products; Worldwide solutions to joint-sealing and acoustic problems; Apr. 9, 1998; 77 pages.
Illbruck; Will-Seal Precompressed expanding foam sealants; Sep. 1988; 4 pages.
Illbruck Inc.; Willseal precompressed foam sealants; 1991; 4 pages.
Illbruck/USA; Will-Seal (binder); 39 pages; 1984.
Illbruck; Product Data Sheet Compriband MPA; Apr. 2000; 2 pages.
Illbruck Sealant Systems, inc.; Fax-Message of Jan. 30, 2002; Jan. 30, 2002; 14 pages.
Illbruck Sealant Systems, inc.; Fax-Message of Feb. 15, 2002; Feb. 15, 2002; 14 pages.
Iso-Chemie GmbH; Sicherheitsdatenblatt (ISO Flame Kombi F120); Jun. 30, 2004; 3 pages.
IsoChemie; Invoice 135652 to Schul International Co., LLC. for Iso-Bloco 600 and Iso-Flame Kombi F120; Apr. 26, 2007; 3 pages // IsoChemie; Order Confirmation 135652 to Schul International Co., LLC. for Iso-Bloco 600 and Iso-Flame Kombi F120; Apr. 26, 2007; 3 pages // IsoChemie; Correspondence of Jun. 8, 2006 and prior; 13 pages // Schul International Company; Invoice 18925 to P.J., Spillane; Sep. 14, 2007; 6 pages.
Katz, Harry S. and Milewski, John V.; Handbook of Fillers for Plastics; 1987; pp. 292-312.
Polytite Manufacturing Corp.; Spec Section 07920 Polytite Expansion Joint System; 1 page; May 1989.
Sandell Manufacturing Company, Inc.; About Polyseal—procompressed joint sealant—from Sandell Manufacturing; 2 pages; Mar. 15, 1999.
Sandell Manufacturing Company, Inc.; Polyseal Procompressed Joint Sealant; 2 pages; Undated.
Sandell Manufacturing Company, Inc.; Polytite Sealant & Construction Gasket; 1 page; 1978.
Schul International Co., LLC.; Seismic Sealtite "R"; 2 pages; 2002.
Soudal NV; Soudaband Acryl; Jun. 7, 2005; 4 pages.
Tremco Illbruck; Illbruck illmod Trio; Jun. 2007; 2 pages.
Tremco illbruck Produktion GmbH; Materials Safety Data Sheet (illmod 600); Mar. 2, 2007; 4 pages.
Westinghouse Savanah River Company; Design Proposal for Sealing Gap at Z-Area Saltstone Vault One, Cell A (U); 6 pages; Jul. 26, 1994; Aiken, South Carolina, available at http://pbadupws.nrc.gov/docs/ML0901/ML090120164.pdf, indexed by Google.
Iso Chemie GmbH; Iso-Flame Kombi F120; Jul. 1, 2006; 2 pages.
IsoChemie; Technical Datasheet blocostop F-120; Jul. 26, 2002; 1 page.
Lester Hensley; Where's the Beef in Joint Sealants? Hybrids Hold the Key; Spring 2001; Applicator vol. 23 No. 2; 5 pages (alternative version available at http://www.emseal.com/InTheNews/2001HybridsConstructionCanada.pdf).
MM Systems; ejp Expansion Joints EIF; Nov. 16, 2007; 2 pages.
MM Systems; ejp Expansion Joints; Nov. 16, 2007; 2 pages.
MM Systems; MM ColorJoint/SIF Series; 3 pages; Jan. 14, 2007.
Norton Performance Plastics Corporation; Norseal V740FR; 1996; 2 pages.
PCT/US2005/036849 tiled Oct. 4, 2005 by Emseal Corporation; 11 pages; published Mar. 1, 2007 by World Intellectual Property Organization as WO 2007/024246.
Promat; Promaseal FyreStrip Seals for Movement in Joints in Floors/Walls; Feb. 2006; 4 pages.
Promat; Promaseal Guide for linear gap seals and tire stopping systems; 20 pages; Jun. 2008.
Promat; Promaseal IBS Foam Strip Penetration Seals on Floors/Walls; Sep. 2004; 6 pages.
Promat; Promaseal IBS Safety Data Sheet; Jul. 25, 2007; 3 pages.
Salamander Industrial Products Inc.; Blocoband HF; Feb. 15, 1996; 1 page.
Schul International Co. LLC; Color Econoseal Technical Data; Nov. 18, 2005; 2 pages.
Schul International Co. LLC; Sealtite "B" Technical Data; Oct. 28, 2005; 2 pages.
Schul International Co. LLC; Sealtite Airstop AR; Apr. 2004; 1 page.
Schul International Co. LLC; Sealtite Airstop FR; Apr. 2007; 1 page.
Schul International Co. LLC; Sealtite Standard; May 9, 2007; 2 pages.
Schul International Co. LLC; Sealtite Technical Data; Oct. 28, 2005; 2 pages.
Schul International Co. LLC; Sealtite VP (600) Technical Data; 2002.
Schul International Co. LLC; Seismic Sealtite II Technical Data; Sep. 20, 2006; 2 pages.
Schul International Co. LLC; Seismic Sealtite Technical Data; Oct. 28, 2005; 2 pages.
Lee W. Young, Written Opinion of the International Searching Authority, PCT/US06/60096, dated Oct. 23, 2007, 4 pages, USPTO, USA.
Schul International Inc.; Sealtite 50N Technical Data; 2002; 2 pages.
Schul International Inc.; Sealtite 50N Technical Data; Oct. 28, 2005; 2 pages.

(56) References Cited

OTHER PUBLICATIONS

Emseal's new Universal-90 expansion joints, Buildingtalk, Mar. 27, 2009, 2 pages, Pro-Talk Ltd.
Schul International Inc.; Sealtite VP; Oct. 28 2005; 2 pages.
Schul International Inc.; Sealtite; Jul. 25, 2008; 3 pages.
Sealant Waterproofing & Restoration Institute; Sealants: The Professionals' Guide p. 26; 1995; 3 pages.
Stein et al. "Chlorinated Paraffins as Effective Low Cost Flame Retardants for Polyethylene" Dover Chemical Company 9 pages.
Tremco illbruck B.V.; Cocoband 6069; Apr. 2007; 2 pages.
Tremco illbruck Limited; Alfacryl FR Intumescent Acrylic; Oct. 22, 2007; 2 pages.
Tremco illbruck Limited; Alfasil FR Oct. 22, 2007; 2 pages.
Tremco illbruck Limited; Compriband 600; Oct. 5, 2007; 2 pages.
Tremco illbruck Limited; Compriband Super FR; Dec. 4, 2007; 2 pages.
Tremco illbruck Limited; Technical Data Sheet Product Compriband Super FR; Oct. 18, 2004; 4 pages.
Tremco Illbruck Limited; Technical Data Sheet Product: Compriband Super; Sep. 29, 2004; 3 pages.
Tremco illbruck Limited; TechSpec Division Facade & Roofing Solutions; Mar. 2005; 10 pages.
Tremco illbruck; Alfas Bond; Apr. 13, 2007; 2 pages.
Tremco Illbruck; illmod 600; Jun. 2006; 2 pages.
Tremco illbruck; The Specification Product Range; Feb. 2007; 36 pages.
Tremco-illbruck Ltd.; Webbflex B1 PU Foam; Nov. 9, 2006; 2 pages.
Thomas Dunn, International Preliminary Report on Patentability—PCT/US06/60096, dated Oct. 21, 2008, 6 pages, USPTO, USA.
Underwriter Laboratories Inc.; UL 2079 Tests for Fire Resistance of Building Joint Systems; Jun. 30, 2008; 38 pages.
Underwriter Laboratories LLC; System No. WW-S-0007 Joint Systems; Dec. 5, 1997 pages.
Underwriters Laboratories; Fire-resistance ratings ANSI/UL 263; 2014; 24 pages.
Underwriters Laboratories; UL 263 Fire Tests of Building Construction and Materials; Apr. 4, 2003; 40 pages.
Lee W. Young, International Search Report, PCT/US06/60096, dated Oct. 23, 2007, 2 pages, USPTO, USA.
BEJS System, Mar. 2009, 2 pages, Emseal Joint Systems, Ltd., USA.

DURABLE WATER AND FIRE-RESISTANT TUNNEL EXPANSION JOINT SEAL

CROSS-REFERENCE TO RELATED APPLICATIONS

This application is a continuation-in-part of U.S. patent application Ser. No. 15/714,390 filed Sep. 25, 2017 for "Expansion joint seal system with internal intumescent springs providing fire retardancy," now U.S. Pat. No. 10,000,921 issued Jun. 19, 2018, which is incorporated herein by reference, which is a continuation of U.S. patent application Ser. No. 15/217,085 filed Jul. 22, 2016, now U.S. Pat. No. 9,803,457 issued Oct. 31, 2017, for "Expansion Joint Seal System Providing Fire Retardancy," which is incorporated herein by reference.

STATEMENT REGARDING FEDERALLY SPONSORED RESEARCH OR DEVELOPMENT

Not Applicable.

BACKGROUND

Field

The present disclosure relates generally to systems for creating a durable water-resistant and fire-resistant foam-based seal in the joint between adjacent panels. More particularly, the present disclosure is directed to providing an expansion joint seal system which includes a plurality of intumescent members to protect the adjacent substrates and joint.

Description of the Related Art

Construction panels come in many different sizes and shapes and may be used for various purposes, including roadways, sideways, tunnels and other pre-cast structures. Where the construction panels are concrete, it is necessary to form a lateral gap or joint between adjacent panels to allow for independent movement, such in response to ambient temperature variations within standard operating ranges. These gaps are also used to permit moisture to be collected and expelled. Cavity walls are common in masonry construction, typically to allow for water or moisture to condense or accumulate in the cavity or space between the two exterior walls. Collecting and diverting moisture from the cavity wall construction can be accomplished by numerous well-known systems. The cavity wall is often ventilated, such as by brick vents, to allow air flow into the cavity wall and to allow the escape of moisture heat or humidity. In addition to thermal movement or seismic joints in masonry walls, control joints are often added to allow for the known dimensional changes in masonry over time. Curtain wall or rain screen design is another common form of exterior cladding similar to a masonry cavity wall. Curtain walls can be designed to be primarily watertight but can also allow for the collection and diversion of water to the exterior of the structure. A cavity wall or curtain wall design cannot function as intended if the water or moisture is allowed to accumulate or condense in the cavity wall or behind a curtain wall or rain screen design cannot be diverted or redirected back to the outside of the wall. If moisture is not effectively removed it can cause damage ranging from aesthetic in the form of white efflorescence buildup on surface to mold and major structural damage from freeze/thaw cycling.

Thus, expansion and movement joints are a necessary part of all areas of construction. The size and location of the movement depends on variables such as the amount of anticipated thermal expansion, load deflection and any expected seismic activity. Joint movement in a structure can be cyclical in design as in an expansion joint or in as a control joint to allow for the shrinkage of building components or structural settling. These movement joints serve an important function by allowing a properly designed structure to move and the joint to cycle over time and to allow for the expected dimensional changes without damaging the structure. Expansion, control and movement joints are found throughout a structure from the roof to the basement, and in transitions between horizontal and vertical planes. It is an important function of these expansion joints to not only move as intended but to remain in place through their useful lifespan. This is often accomplished by extending the length and/or width of the expansion joint system over or past the edge of the gap or joint opening to attach to the joint substrate or another building component. Examples of building components that would ideal to integrally join an expansion joint with and seal would be, although not limited to, waterproofing membranes, air barrier systems, roofing systems and transitions requiring the watertight diversion of rain water. Although these joints represent only a small percentage of the building surface area and initial cost, they often account for a large percentage of waterproofing, heat loss, moisture/mold problems and other serious interior and exterior damage during the life of the building.

Conventional joint sealants like gunnable sealants and most foam seals are designed to hold the water out of the structure or expansion joint. However, water can penetrate the joint substrate in many ways such as cracks, poor sealant installation, roofing details and a porous substrate or wall component. When water or moisture enters the wall the normal sealing function of joint sealant may undesirably retain the moisture in the wall. Foam joint seals known in the art typically rely on the application of an elastomer sealant on the primary or exposed face of foam to provide the water resistant function. Such joint seals are not waterproof, but retard the penetration of water into the joint by providing a seal between adjacent substrates for a time and under a maximum pressure. Particularly, such joint seals are not waterproof—they do not preclude water penetration under all circumstances. While this is helpful initially to keep water out of the joint and structure it does not allow for this penetrating water or moisture to escape.

Further complicating operation, some wall designs, such as cavity walls, allow for moisture to enter a first wall layer where it collects and is then directed to the outside of the building by flashing and weep holes. In these systems, water can sometimes be undesirably trapped in the cavity wall, such as at a mortar bridge in the wall, or other impediment caused by poor flashing selection, design or installation. When a cavity wall drainage system fails, water is retained within the structure, leading to moisture accumulating within in the wall, and to an efflorescence buildup on the exterior of the wall. This can also result in freeze-thaw damage, among other known problems.

To be effective in this environment, fully functional, foam-based joint seals require a minimum compression ratio and impregnation density. It is known that higher densities and ratios can provide addition sealing benefits. Cost, however, also tends to increase with overall density. There is ultimately a trade-off between compression ratio/density range and reasonable movement capabilities at about 750 kg/m$^3$. As can be appreciated, this compressed density is a product of the uncompressed density of the material and the desired compression ratio to obtain other benefits, such as water resistance. For example, a foam having an uncompressed density of 150 kg/m$^3$ uncompressed and compressed at a 5:1 ratio results in a compressed density of 750 kg/m$^3$. Alternative uncompressed densities and compression ratios may reach that compressed density of 750 kg/m$^3$ while producing different mechanical properties. It has been long known in the art that a functional water and fire resistant foam expansion joint sealant can be constructed using an uncompressed impregnated foam density range of about 80 kg/m$^3$ at a 5:1 compression ratio, resulting in a compressed density of 400 kg/m$^3$. This functional water and fire resistant foam expansion joint sealant is capable of maintaining position within a joint and its profile while accommodating thermal and seismic cycling, while providing effective sealing, resiliency and recovery. Such joint seals are not fireproof, but retard the penetration of fire into the joint by providing a seal which protects the adjacent substrates or the base of the joint for a time and under a maximum temperature. Particularly, such joint seals are not fireproof—they do not preclude the burning and decomposition of the foam when exposed to flame.

Another alternative known in the art for increasing performance is to provide a water resistant impregnated foam at a density in the range of 120-160 kg/m$^3$, ideally at 150 kg/m$^3$ for some products, with a mean joint size compression ratio of about 3:1 with a compressed density in a range of about 400-450 kg/m$^3$, although greater densities may also be used. These criteria ensure excellent movement and cycling while providing for fire resistance according to DIN 4102-2F120, passing UL 2079 for a two-hour rating or greater and an ASTM E-84 test result with a Flame Spread of 0 and a Smoke Index of 5. This density range is well known in the art, whether it is achieved by lower impregnation density and higher foam compression or higher impregnation density and a lower compression ratio, as the average functional density required for an impregnated open cell foam to provide sealing and other functional properties while allowing for adequate joint movement up to +/−50% or greater. Foams having a higher uncompressed density may be used in conjunction with a lower compression ratio, but resiliency may be sacrificed. As the compressed density increases, the foam tends to retard water more effectively and provides an improved seal against the adjacent substrates. Additives that increase the hydrophobic properties or inexpensive fillers such as calcium carbonate, silica or alumina hydroxide (ATH) provided in the foam can likewise be provided in a greater density and become more effective. Combustion modified foams such as a combustion modified flexible polyurethane foam, combustion modified ether (CME) foam, combustion modified high resilience (CMHR) foam or combustion modified Viscoelastic foam (CMVE) can be utilized in the preferred embodiments to add significant fire resistance to the impregnated foam seal or expansion joint without adding additional fire retardant additives. Foam that is inherently fire resistant or is modified when it manufactured to be combustion or fire-resistant reduces the cost of adding and binding a fire retardant into the foam. This method has been found to be advantageous in allowing fire resistance in foam seals configured in very high compression ratios such 5:1 and higher.

By selecting the appropriate additional component, the type of foam, the uncompressed foam density and the compression ratio, the majority of the cell network will be sufficiently closed to impede the flow of water into or through the compressed foam seal thereby acting like a closed cell foam. Beneficially, an impregnated or infused open cell foam can be supplied to the end user in a pre-compressed state in rolls/reels or sticks that allows for an extended release time sufficient to install it into the joint gap. To further the sealing operation, additional components may be included. For example, additives may be fully or partially impregnated, infused or otherwise introduced into the foam such that at least some portion of the foam cells are effectively closed, or a hydrophobic or water resistant coating is applied. However, the availability of additional components may be restricted by the type of foam selected. Closed cell foams which are inherently impermeable for example, are often restricted to a lower joint movement range such as +/−25% rather than the +/−50% of open celled foams. Additionally, the use of closed cell foams restricts the method by which any additive or fillers can be added after manufacture. Functional features such as fire resistance to the Cellulosic time-temperature curve or passing the requirements for a UL 2079 listing for two hours or greater can be however be achieved in a closed cell foam seal without impacting the movement properties. Intumescent graphite powder added to a polyethylene (PE), ethylene vinyl (EVA) acetate or other closed cell foam during processing in a ratio of about 10% by weight has been found to be a highly effective in providing flexible and durable water and fire resistant foam seal. While intumescent graphite is preferred, other fire retardants added during the manufacture of the closed cell foam are anticipated and the ratio of known fire retardants, added to the formulation prior to creating the closed cell foam, is dependent on the required fire resistance and type of fire retardant. Open celled foams, however, present difficulties in providing water-resistance and typically require impregnation, infusion or other methods for introducing functional additives into the foam. The thickness of a foam core or sheet, its resiliency, and its porosity directly affect the extent of diffusion of the additive throughout the foam. The thicker the foam core or sheet, the lower its resiliency, and the lower its porosity, the greater the difficulty in introducing the additive. Moreover, even with each of these at optimum, the additive will likely not be equally distributed throughout the foam, but will be at increased density at the inner or outer portions depending on the impregnation technique.

A known solution in the art is the use of foam segments bonded together to provide a lamination. However, lamination increases cost due to the additional time and labor required as a forming fixture is often required for construction of the lamination. The required time and labor is further increased if additional function coatings are required to create a composite material with the desired properties.

It is also known that the thin built-up laminations must be adhesively bonded to avoid separation, and therefore failure, under thermal shock, rapid cycling or longitudinal shear. Because of the cost to effectively bond the laminations, a cost/performance assessment sometimes produces laminations loosely held together by the foam compression rather than by an adhesive. While this is known in the art to be somewhat effective in low performance applications and OEM assembly uses, it also known that it cannot meet the demands of high movement seismic, shear, deflection joints or where fail-safe performance is required. In light of these issues, the preferred embodiment for a high movement impregnated foam expansion joint has been found to instead be a monolithic foam design comprised of a single impregnated foam core. However, lamination systems are often still considered desirable when the lamination adds a functional feature such as integrating a water resistant membrane, a fire resistant layer or other beneficial function.

Construction of lamination systems are typically considered undesirable or inferior for a high movement or rapid cycling fire resistant expansion joint sealant. The higher compression ratios and greater volumes of fire retardant additives are likely to cause the foam to fatigue more rapidly and to lose much of its internal recovery force. This proves problematic over time due to the anticipated exposure to movement and cycling as the impregnated foam will tend to lose its recovery force and rely more on the push-pull connection to the joint substrate. When foam laminations are vertically-oriented, the laminations can de-bond or de-laminate and separate from one another, leading to only the outer most lamination remaining attached to the joint substrate, resulting in the laminated foam joint sealant ceasing to provide either water, air or fire resistance.

A known alternative or functional supplement to the use of various impregnation densities and compression ratios is the application of functional surface coatings such as water-resistant elastomers or fire-resistant intumescents, so that the impregnated foam merely serves as a "resilient backer". Almost any physical property available in a sealant or coating can be added to an already impregnated foam sealant layering the functional sealant or coating material. Examples would include but not limited to, fire ratings, waterproofing, color, UV resistance, mold and mildew resistance, soundproofing, impact resistance, load carrying capacity, faster or slower expansion rates, insect resistance, conductivity, chemical resistance, pick-resistance and others known to those skilled in the art. For example, a sealant or coating having a rating or listing for Underwriters Laboratories 2079 may be applied to an impregnated compressed foam to create a fire resistant foam sealant.

One approach to addressing the shortcomings has been the creation of composite materials, where the foam core—whether solid or composed of laminations of the same or differing compositions—is coated or surface impregnated with a functional layer, so that the foam is merely a resilient backer for the sealant, intumescent or coating, such that the composition and density become less important. These coatings, and the associated properties, may be adhered to the surface of each layer of a core or layered thereon to provide multiple functional properties. As can be appreciated, the composite material may have different coatings applied the different sides to provide desired property or properties consistent with its position. Functional coatings such as a water-resistant sealant can protect the foam core from absorbing moisture even if the foam or foam impregnation is hydrophilic. Similarly, a functional coating such as a fire-rated sealant added to the foam core or lamination with protect a foam or foam impregnation that is flammable. A biocide may even be included. This could be layered, or on opposing surfaces, or—in the case of a laminate body—on perpendicular surfaces.

Additionally, it has become desirable, and in some situations required, for the joint sealant system to provide not only water resistance, but also fire resistance. A high degree of fire resistance in foams and impregnated foam sealants is well known in the art and has been a building code requirement for foam expansion joints in Europe for more than a decade. Fire ratings such as UL 2079, DIN 4102-2, BS 476, EN1399, AS1503.4 have been used to assess performance of expansion joint seals, as have other fire resistance tests and building codes and as the basis for further fire resistance assessments, the DIN 4102 standard, for example, is incorporated into the DIN 18542 standard for "Sealing of outside wall joints with impregnated sealing tapes made of cellular plastics-Impregnated sealing tapes". While each testing regime utilizes its own requirements for specimen preparation and tests (water test, hose stream tests, cycling tests), the 2008 version of UL 2079, the ISO 834, BS 476: Part 20, DIN 4102, and AS 1530.4-2005 use the Cellulosic time/temperature curve, also known as the standard nominal fire curve, based on the burning rate of materials found in general building materials and contents, which can be described by the equation $T=20+345*LOG(8*t+1)$, where t is time in minutes and T is temperature in C. With thermocouples on the unexposed side of the test assembly, the bottom 124 of each of the plurality of foam members 102, to obtain a fire endurance duration rating under UL 2079, the joint system must sustain the applied load during the rating period and, for those less than a maximum width of six (6) inches, the transmission of heat through the joint system shall not have raised the temperature at the hottest point more than 325° F. (181° C.) above its initial temperature during the rating period. For joint systems having a maximum width equal to or greater than six (6) inches, the temperature rise as determined by the average of all values recorded over the joint system shall not have increased by more than 250° F. (139° C.). For floor-to-wall and head-of-wall systems, transmission of heat through the joint system shall not have raised the temperature of the structure (substrates included) one (1) inch from the joint system more than 325° F. (181° C.) above its initial temperature during the rating period. While differing somewhat, each of these testing regimes addresses cycling and water resistance, as these are inherent in a fire or water and fire resistant expansion joint. The fire resistance of a foam sealant or expansion has been sometimes partially or fully met by infusing, impregnating or otherwise putting into the foam a liquid-based fire retardant, such as aluminum tri-hydrate or other fire retardants commonly used to add fire resistance to foam. Unfortunately, this increases weight, alters the foam's compressibility, and may not provide the desired result without additional fire resistant coatings or additives if a binder, such as acrylic or polyurethane, is selected to treat the foam for fire and water resistance. Doing so while maintaining movement properties may affect the foam's compressibility at densities greater than 750 kg/m$^3$. Ultimately, these specialty impregnates and infused compositions increase product cost.

It has further become desirable or functionally required to apply a fire resistant coating to the foam joint systems to increase fire and water resistance, but often at the sacrifice of movement. Historically, fire-resistant foam sealant products that use an additional fire resistant surface coating to obtain the life safety fire properties have been limited to only +/−25% movement capability, especially when required to meet longer time-temperature requirements such as UL2079's 2 hour or longer testing. This +/−25% movement range is too limited for most movement joints and would not meet most seismic movement and expansion joint requirements. One well-known method for utilizing these low movement fire resistant joint sealants is to increase the width or size of the joint opening, an undesirable and expensive alternative, to allow for a commonly required +/−50% joint movement rating.

Unfortunately, supplying a pre-coated foam seal from the factory requires long leads times due to the required curing time, which can often hold up completion of projects in the final stages. This shortcoming is exacerbated if the composite material requires an additional functional layer to provide the desired properties. Installing the foam seal and adding another sealant in the field eliminates the one-step advantage of pre-compressed foam seals. The required multi-step process is labor and skill intensive and becomes even more challenging when the joint becomes greater than one inch, which pose difficulties for installation and to provide an aesthetically pleasing finished joint seal.

It would be an improvement to the art to provide an expansion joint seal which provided resistance to fire and water, retained compressibility over time, and did not require impregnating, infusing or compression forcing a large amount of solid fillers into the foam structure.

SUMMARY

The present disclosure therefore meets the above needs and overcomes one or more deficiencies in the prior art. The disclosure provides a fire-resistant and water-resistant expansion joint seal, comprising one or more foam members and a plurality of intumescent members, such that each intumescent member is interspersed between two foam members or within a foam member. The foam members generally having a common foam length. Each of the foam members is at least five times wider than the narrowest of the intumescent members, although all foam members need not be of common width and all intumescent members need not be of consistent width. The intumescent members are typically of common height and present a wave-like cross-section, though height variations may be selected for mechanical preferences provided the intumescent members do not extend beyond the foam members. Similarly, the foam members are of common height, which is may be equivalent to the height of the intumescent members.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

The present disclosure provides a fully fire-rated expansion joint that is designed primarily with the driving rain, but vapor permeable, waterproofing and cycling function of an expansion joint in mind. The present disclosure provides for effective joint seal, which may sustain a 70+mph (600 Pa) driving rain or greater. The present disclosure may also allow vapor pressure to escape/transfer moisture back to the exterior of the structure. The present disclosure provides a highly water resistant system that can additionally allow for moisture to migrate back out of the wall, typically through vapor pressure. Further, the present disclosure provides a fire resistant system without impacting the water-resistance or vapor permeability properties of the impregnated foam seal. The present disclosure provides intumescent members in a vertical orientation that unexpectedly add transfer load support to the exposed surface. The present disclosure provides alternatives which are horizontally-oriented to enhance the internal recovery force of the expansion joint seal and to retain positive pressure on the joint substrate. The present disclosure further provides the exposed foam top surface may be coated or partially coated with a flexible or semi-rigid elastomer to increase load carrying capability which is further enhanced by the supporting intumescent members.

As can be appreciated, sealants, coatings, functional membranes, adhesives and other functional materials may be applied to or included within the components of the disclosure.

Figure 1:
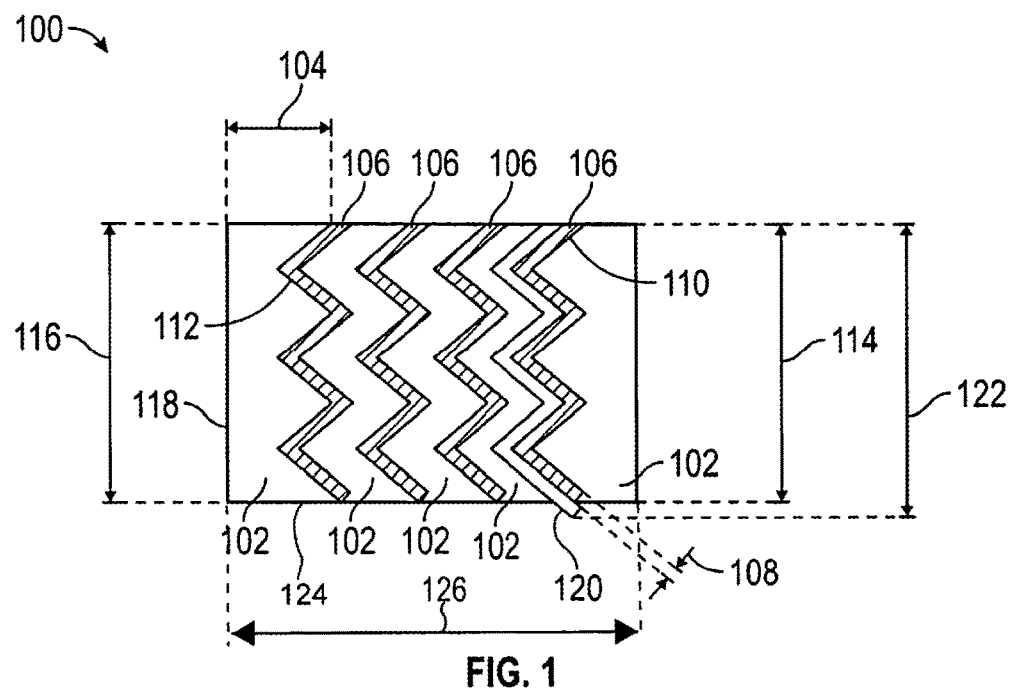
FIG. 1 illustrates an end view of an expansion joint seal according to the present disclosure.

Referring to FIG. 1, an end view of an expansion joint seal according to the present disclosure is provided. The fire-resistant and water-resistant expansion joint seal 100 includes a plurality of foam members 102 and a plurality of intumescent members 106. Each of the plurality of foam members 102 has a foam length 202, a foam width 104 and a foam height 114. The foam length 202, a foam width 104, and foam height 114 may vary from one foam member 102 to another.

Figure 2:
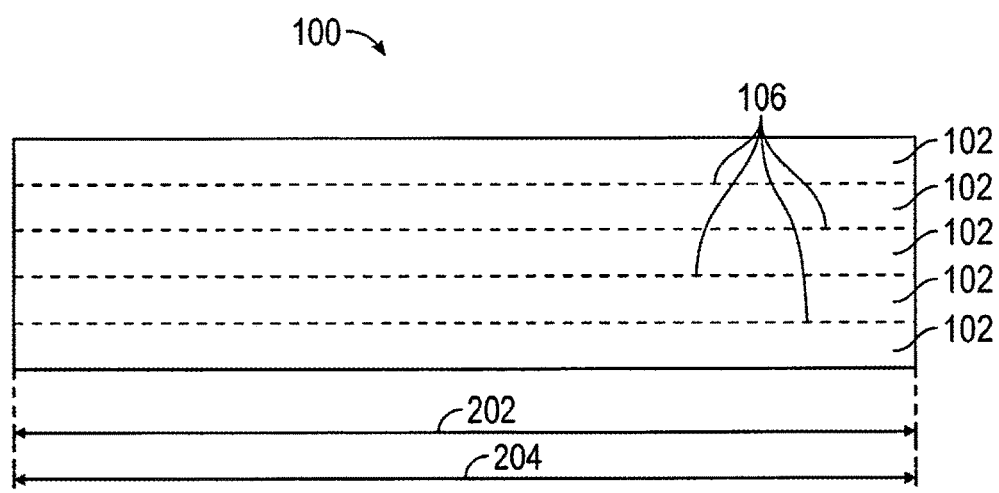
FIG. 2 illustrates a side view of an expansion joint seal according to the present disclosure.

Referring to FIG. 2, a side view of an expansion joint seal according to the present disclosure is provided. Each of the intumescent members 106 has an intumescent length 204, which may be equivalent to the foam length 202. Intumescent members 106 may have an intumescent length 204 shorter than the foam length 202, and a plurality of separate intumescent members 106 may be sequentially positioned along the foam 102 to be nearly equivalent to the foam length 202. Separate, shorter intumescent members 106 may be beneficial in avoiding any propagation of a failure of the resiliency of any one intumescent member 106. Each of the plurality of intumescent members 106 has an intumescent width 108. Additionally, each of the plurality of intumescent members 106 has a lateral cross section 110, presents a wave-like profile 112, and has an intumescent member height 116. The intumescent member 106 is therefore rigid, or at least semi-rigid, resilient, and derives a spring force from that rigidity and resiliency. The degree of rigidity and intumescing may be controlled by selecting the composition of the intumescent members, such as an intumescent compound bound in a polymer matrix or a member formed entirely of an intumescent compound or material. The intumescent length 204, the intumescent width 108, the intumescent height 116, and the wave-like profile 112 may vary from one intumescent member 106 to another, resulting in different spring forces in the different intumescent members 106. The narrowest of the foam members 102 has a foam width 104 is at least five (5) times the intumescent width 108 of the narrowest intumescent member. Each intumescent member 106 is preferably interspersed between, and adhered to, the adjacent two foam members 102, so as to present an integral whole. The intumescent member height 116 of each intumescent member is equal to, or less than, the foam height 114 of the adjacent foam members 102. The foam members 102 may be a single foam body where the intumescent member height 116 is less than, the foam height 114. Preferably, each of the plurality of intumescent members 106 present an identical wave-like profile 112, through variations may be selected to further the disclosure. The intumescent member 106 is selected from a composition and in a waveform to provide a spring force with a long life against fatigue.

Any of various types of foam known in the art may be selected for foam member 102, including compositions such as polyurethane and polystyrene, and may be open or closed cell. The uncompressed density of the foam members 102 may also be altered for performance, depending on local weather conditions. Because of the fire-resistant and water-resistant expansion joint seal 100 may be composed of a plurality of foam members 102, more than one composition may be selected for the various foam members, such that at least one foam member 102 has a mechanical property or composition different from the balance of the plurality of foam members 102. One or more of the foam members 102, for example, may be selected of a composition which is fire retardant or water resistant.

The foam member 102 is sized to provide a foam width 104 of sufficient width to provide the water resistance function while be sufficiently narrow to be shielded from fire when the adjacent intumescent members 106 intumesce, thereby providing a continuous protective insulating char layer as a barrier across the fire-resistant and water-resistant expansion joint seal 100.

The foam members 102 may be selected to provide a lower density at installation, whether by a low uncompressed density or a lower compression ratio, so as to provide a spring force less than that of the intumescent members 106. The foam members 102 therefore accommodate lateral compression caused by fluctuation of the distance between the substrates, the joint width, while the intumescent members 106, by virtue of the wave-like profile 112 provide the spring force in at least the plane parallel to the substrate faces, but potentially also transverse to the joint. Downward loads on the fire-resistant and water-resistant expansion joint seal 100 are thus opposed by the intumescent members 106, which compress in response to loading and which transfer the vertical load into the horizontal plane, and therefore into the foam members 102. The intumescent members 106 therefore support downward loads by compressive support. The intumescent members 106, by virtue of the common wave shape, retard any vertical deviation of the foam members 102, as the compression ratio is lowest when the intumescent members 106, and therefore the foam members 102, are aligned. As provided above, the foam members 102 may be provided as a rectangular prism—resulting in differing compression ratios along the body, or cut to match the wave-like profile 112 of the intumescent members 106. Where a common wave-like profile 112 is utilized, the intumescent members 106 allow for greater concentration of intumescent members 106 without substantially impacting the compressibility ratio of the foam members 102.

A foam member 102 may be altered to provide additional functional characteristics. A foam member 102 may be infused, impregnated, partially impregnated or coated with an impregnation material or binder that is designed specifically to provide state of the art foam seal water-resistance properties with a uniform and consistent distribution of the waterproofing binder. A foam member 102 may also, or alternatively, be infused or impregnated or otherwise altered to retain a fire retardant, dependent on function. Any suitable open cell foam type with a density of 16-45 kg/m3 or higher can provide an effective water-resistant foam-based seal by varying the impregnation density or the final compression ratio.

One or more of the foam members 102 may be selected from an inherently hydrophilic foam or have a hydrophilic component such as a hydrophilic polymer that is uniformly distributed throughout the foam. The foam members 102 may include strategically-placed surface impregnation or partially impregnate with a hydroactive polymer. Because the primary function of the foam body 102 is waterproofing, rather than fire-resistance, the addition of a hydrophilic function does not negatively impact the fire-resistant properties, as an increased moisture content in the foam body 102 may increase fire resistive properties. Beneficially, because the intumescent members 106 provide fire resistance, the present disclosure provides for a water and fire resistant expansion joint sealant without the need to impregnate the foam body 102 with a fire retardant.

Moreover, a foam member 102 may be selected from partially closed cell or viscoelastic foams. Most prior art foams seals have been designed as "soft foam" pre-compressed foam seals utilizing low to medium density foam (about 16-30 kg/m3) and softer foam (ILD range of about 10-20). It has been surprisingly found through extensive testing of variations of foam densities and foam hardness, fillers and elastic impregnation compounds that higher density "hard" foams with high ILD's can provide an effective foam seal meeting the required waterproofing (600 Pa minimum and ideally 1000 Pa or greater) and movement and cycling requirements such as ASTM E-1399 Standard Test Method for Cyclic Movement and Measuring the Minimum and Maximum Joint Widths of Architectural Joint Systems as well as long term joint cycling testing. An advantage has been found in using higher density and higher hardness (higher ILD) foams particularly in horizontal applications. While at first this might seem obvious it is known in the art that higher density foams that are about 32-50 kg/m3 with an ILD rating of about 40 and greater tend to have other undesirable properties such as a long term decrease in fatigue resistance. Desirable properties such as elongation, ability to resist compression set, foam resiliency and fatigue resistance typically decline relative to an increase in density and ILD. These undesirable characteristics are often more pronounced when fillers such as calcium carbonate, melamine and others are utilized to increase the foam density yet the cost advantage of the filled foam is beneficial and desirable. Similarly, when graft polyols are used in the manufacture of the base foam to increase the hardness or load carrying capabilities, other desirable characteristics of the base foam such as resiliency and resistance to compression set can be diminished. Through the testing of non-conventional impregnation binders and elastomers for precompressed foam sealants such as silicones, urethanes, polyureas and the like, it has been found that materials that have reduced tack or adhesive properties after cure and which provide a high internal recovery force can be used to counteract the long term fatigue resistance of the high density, high ILD foams. Further, it has been found that by first impregnating and curing the foam with the injected or impregnated silicone, acrylic, urethane or other low tack polymers and, ideally, elastomers with about 200% elongation or greater providing a sufficient internal recovery force, that it was additionally advantageous to re-impregnate the foam with another elastomer or binder to provide a timed expansion recovery at specific temperatures. The impregnation materials with higher long term recovery capabilities imparted to the high density, high ILD base foams, such as a silicone or urethane elastomers, can be used to impart color to the foam seal or be a clear or translucent color to retain the base foam color. If desirable a second impregnation, partial impregnation or coating can be applied to or into the foam seal to add additional functional characteristics such as UV stability, mold and mildew resistance, color, fire-resistance or fire-ratings or other properties deemed desirable to functionality to the foam.

Viscoelastic foams have not typically been commercially available or used for foam seals due to perceived shortcomings. Commonly used formulations, ratios and methods do not provide a commercially viable foam seal using viscoelastic foam when compared to standard polyurethane foams. Open cell viscoelastic foams are more expensive than polyester or polyether polyurethane foams commonly used in foam seals. Any impregnation process on a viscoelastic foam tends to proceed slower than on a traditional foam due to the fine cell structure of viscoelastic foam. This can be particularly frustrating as the impregnation materials and the impregnation process are typically the most expensive component of a foam seal. However, because of their higher initial density viscoelastic foams can provide better load carrying or pressure resistant foam seal. Both properties are desirable but not fully provided for in the current art for use in applications such as load carrying horizontal joints or expansion joints for secondary containment. Common densities found in viscoelastic foams are 64-80 kg/m3 or greater. Additionally, viscoelastic foams have four functional properties (density, ILD rating, temperature and time) compared to flexible polyurethane foams, which have two primary properties (density and an ILD rating).

However, the speed of recovery of viscoelastic foams following compression may be increased by reducing or eliminating any impregnation, surface impregnation or low adhesive strength impregnation compound. Incorporating fillers into the impregnation compound is known to be effective in controlling the adhesive strength of the impregnation binder and therefore the re-expansion rate of the impregnated foam. By surface impregnating or coating the outside surface of one or both sides of viscoelastic foam to approximately 10% of the foam thickness, such as about 3-8 mm deep for conventional joint seals, the release time can be controlled and predicted based on ambient temperature. Alternatively, the foam can be infused, partially impregnated or impregnated with a functional or non-functional filler without a using binder but rather only a solvent or water as the impregnation carrier where the carrier evaporates leaving only the filler in the foam.

The re-expansion rate of a seal using viscoelastic foam may be controlled by using un-impregnated viscoelastic foam strips and re-adhering them with a pressure sensitive adhesive or hot melt adhesive. When the seal is compressed, the laminating adhesive serves as a temporary restriction to re-expansion allowing time to install the foam seal. Viscoelastic foam may be advantageously used, rather than standard polyurethane foam, for joints requiring additional softness and flexibility due to higher foam seal compression in hot climates or exposure or increased stiffness in cold temperatures when a foam seal is at its minimum compressed density. Additionally, closed cell, partially closed cell and other foams can be used as in combination with the viscoelastic foams to reduce the overall cost.

The combination of the force damping foam member 102 and the spring-force intumescent 106 performs the function of providing water resistance without degradation common in the art. The fire-resistant and water-resistant expansion joint seal 100 effectively seals while providing a vapor-permeable barrier, allowing for vapor pressure to escape/transfer moisture back to the exterior of the structure. The fire-resistant and water-resistant expansion joint seal 100 may sustain a 70+mph (600 Pa) driving rain or greater.

Figure 3:
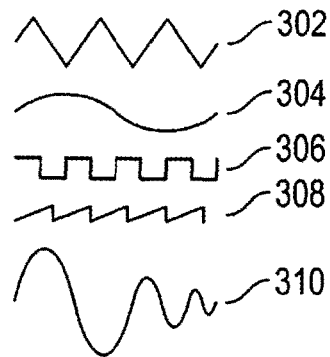
FIG. 3 illustrates several potential wave-life profiles of the intumescent member.

Referring to FIG. 3, a plurality of potential forms for the wave-life profile 112 of the intumescent member 112 are illustrated. The wave-like profile 112 of the intumescent member 106 may be selected from waveforms known in the art, including a triangle wave 302, a sine wave 304, a square wave 306, a sawtooth 308, an irregular wave 310, or any combination of any waveforms known in the art. The wave-like profile 112 may thus provide a zig-zag or wavy profile which may be generally parallel to the face of the joint substrate.

The reaction of the intumescent member 106 to heat may be selected for desired temperature to select the temperature at which the intumescent members 106 cease providing structural support and begin intumescing to provide fire protection. Temperature selection may be desirable to address high pressure water incidents as opposed to fire events. As a result of temperature selection and fire retardant properties of the intumescent members 106 and their interspersing between the foam of the fire-resistant and water-resistant expansion joint seal 100, the foam member 102 need not include a fire retardant. When these intumescent members 106 expand upon exposure to fire, the joint is afforded some protection against fire damage. The intumescent members 106 expand upon exposure to the selected temperature, providing a wider cross section of intumescent expansion and protective crusting over the fire-resistant and water-resistant expansion joint seal 100. Beneficially, the wave-like profile does not result in the joint seal pulling out of the joint during expansion in response to heat, due to the wave-like profile 112 exerting force in multiple directions. As can be appreciated, the wave-like profile 112 may be selected to provide desired directional expansion.

Overlapping intumescent fire protection is thus provided without the necessity of a continuous member or a coating that connects or touches to both substrates. A continuous, straight cross intumescent cross member, for example, would be too rigid and would no compress or extend, precluding operation of the fire-resistant and water-resistant expansion joint seal 100. Even continuous elastomeric intumescent sealants on the surface in a bellow configuration tend to limit the joint movement capacity and are therefore less desirable.

Offsetting intumescent members 106 so as to overlap the adjacent intumescent member 106 upon intumescing ensures a continuous protective barrier at the exposed portion of the fire-resistant and water-resistant expansion joint seal 100 while ensuring that movement of the fire-resistant and water-resistant expansion joint seal 100 is not restricted until such time. These intumescent members 106, to the extent not reactive to fire, provide backpressure support for the fire-resistant and water-resistant expansion joint seal 100 during exposure to high pressure water.

Referring again to FIGS. 1 and 2, the intumescent members 106, due to the wave-like profile 112 further provide a spring force in the vertical plane, generally parallel to the faces of the adjacent substrates when installed. The fire-resistant and water-resistant expansion joint seal 100 may therefore have the capability to provide the movement of at least +/−50% intended for seismic movement and able to meet rapid cycling requirements.

The wave-like profile 112 offsets forces within the foam members 112 and permits transfer of loads within the foam members 102 in various directions in response to loading, particularly for above. This may prove valuable in lower compression or lower impregnation densities required for higher movement fire rated joint designs. Conventional systems, or systems which might incorporate planar intumescent members lack this force transfer and require an intumescent to protrude or be encased in a wrapping not suitable for exposed, primary sealant or horizontal traffic expansion joints. The wave-like profile 112 permits a fire-resistant and water-resistant expansion joint seal 100 with low density foam, which may even be vapor permeable, which may permit a seal with +/−100% movement in a non-invasively attached non-metallic or refractory blanket design. When combined with a foam member 102 having a desirable fire rating, the intumescent member 106 with a wave-like profile 112 may provide an even-more desirable fire-resistance without the increased depth otherwise required to meet fire-rating standards. This shallower depth to width ratio results in easier installation and lower cost.

When desired, a common wave-like profile 112 may be used, allow for greater concentration of intumescent members 106 between the foam member 102 without substantially impacting the compressibility ratio of the foam member 102 and while retarding any vertical deviation of the foam member 102. Because the foam will seek a lowest state of compression, the common wave-like profile 112 of the plurality of intumescent members 106 causes the foam member 102 to remain aligned. This may be furthered by selecting the appropriate shape for each of the foam member 102 members—whether rectangular prisms, resulting in localized areas of higher compression, or cut to match the wave-like profile 112 so as to avoid such localized areas of higher compression. A selection of non-common wave-like profiles 112 may be desirable to further alter the compression within each foam member 102. Alternatively, intumescent members 106 with differing wave-like profiles 112 may be used, such as those nearly flat for positioning adjacent the substrates for substrate protection or for a bonding surface.

The intumescent members 106, and if desired foam member 102, may be selected for depth as to the extent of protection needed. The intumescent members 106 and the foam member 102, for example, might have a reducing thickness for the intumescent members 106 and/or foam member 102 positioned in the center of the joint. Alternatively, the intumescent members 106 may be vertically centered with respect to the foam member 102, but have an intumescent height 116 clearly less than the foam height 114, so that the intumescent members 106, which providing the spring force in both planes, is not exposed initially between the foam member 102 sections. Additionally, an intumescent member 106 may have a height 116 shorter than the foam height 114 to permit a bonding between adjacent foam members 102 or may permit the sectioning of a foam member 102 with the intumescent member 106 imposed within it.

The intumescent member 106 can be laminated with or otherwise bonded to a resilient member 120 or increase its resistance to moisture and to provide increased durability. The resilient member height 122 of the resilient member 120 can be greater than the intumescent member height 122 of the intumescent member 106. The spring force of the resilient member 120 may be selected to beneficially increase the durability and recovery force of the intumescent member 106. The spring force of the resilient member 120 increases the internal recovery force of the fire-resistant and water-resistant expansion joint seal 100 without requiring an increase or reduction in the impregnation density or compression ratio of the foam members 102.

The intumescent members 106 may be formed of a hydrophilic intumescent member that expands when wet, increasing the resistance of the fire-resistant and water-resistant expansion joint seal 100 to impact damage and hose stream type forces. A hydrophilic intumescent member 106 would thus expand against the joint, retaining its spring function and pushing in different directions, without expanding outward.

Referring to FIGS. 1 and 3, the intumescent member 112 and its wave-life profile 112 may be formed within the foam 102. The foam 102 may be cut to the desired wave-life profile 112 and a flexible intumescent mastic or sealant applied to the foam at the desired thickness to provide the intumescent members 106. The intumescent members 106 may be formed in situ from other fire resistant material having sufficient flexibility to allow for compression after curing while providing a compensating return force when exposed to compression. This in situ formation of the intumescent members 106 may further provide beneficial cost savings by allowing alternating use of the rigid intumescent member and the higher modulus intumescent mastic/sealant. Additionally, the in situ formation may provide a well-fitted assembly between the foam 102 and the intumescent members 106. Preformed intumescent members 106, however, may be advantageous for better compressing the foam to different ratios to increase the compressive force resistance and reduce the tendency of the foam to take a compression set over time. Regardless, the intumescent members 106 offer the same fire resistant properties in conjunction with an impregnated open cell foam, and alternatively a closed cell foam, with a primary function to act as a water resistant seal.

The present disclosure thus avoids the foam member 102 taking a compression set, such as during a hot summer, so that when the substrates separate in cold weather, the foam member 102 has lost resiliency and fails instead of expanding to fill the increased joint size. The wave-like profile 112 of the intumescent member 106 retards such a condition. The foam member 102, particularly when cut in rectangular profiles and imposed between each intumescent member 106, has localized areas of differing compression. The portion of foam member 102 adjacent an impinging wave-like profile 112 is compressed, while the portion of foam member 102 distant the impinging wave-like profile 112, and therefore adjacent the corresponding section in the adjacent intumescent member 106 or a substrate is in a lower state of compression, essentially inducing expansion of the foam member 102 intermediate the two positions. The foam member 102 therefore accommodates lateral compression caused by fluctuation of the distance between substrates joint width. The recovery speed and force of the fire-resistant and water-resistant expansion joint seal 100 can be modified by selecting a foam member 102 with a higher or lower Indention Load Deflection (ILD), which is used to determine the "hardness" or resistance of compression of the foam. Additionally, the foam member 102 may be selected to provide a sufficiently porous body to permit vapor to escape from the joint.

Figure 4:
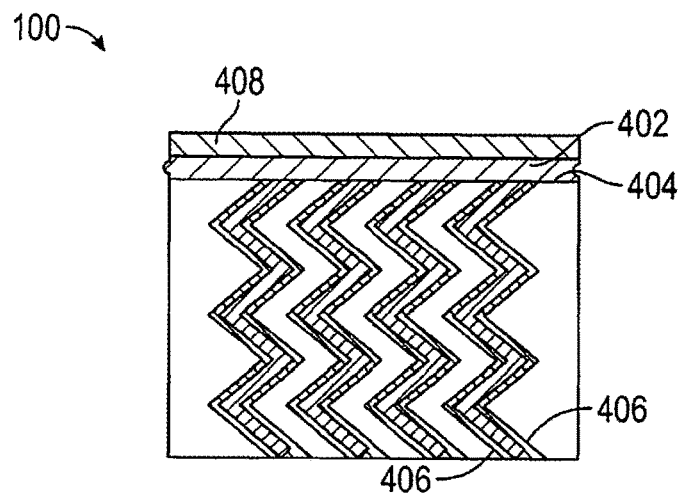
FIG. 4 illustrates an end view of an alternative expansion joint seal according to the present disclosure.

Referring to FIG. 4, an end view of an alternative expansion joint seal according to the present disclosure is provided. A further fire retarding layer 402 may be applied across the top 404 of the fire-resistant and water-resistant expansion joint seal 100. The fire retarding layer 402 may be an intumescent or a fire-retarding elastomer, such as Dow Corning 790.

Additionally, a coating 406 may be used intermediate the foam member 102 and the intumescent member 106. The coating 400 may have a moisture resistance to better retard moisture from reaching the intumescent member 106 from the foam member 102, or may be adhesive to better facilitate a bond between the foam member 102 and the intumescent member 106 or the fire retarding layer 402, and may be applied to one or both of the foam member 102 and the intumescent member 106.

The fire-resistant and water-resistant expansion joint seal 100 may further include an insulating layer 408, such as a silicate at the top 404 of the fire-resistant and water-resistant expansion joint seal 100, over the fire retarding layer 402, or in the foam member 102, to add a refractory of insulating function. However, such a layer, unless otherwise selected, would not be a fire-retardant liquid glass formulation.

Figure 5:
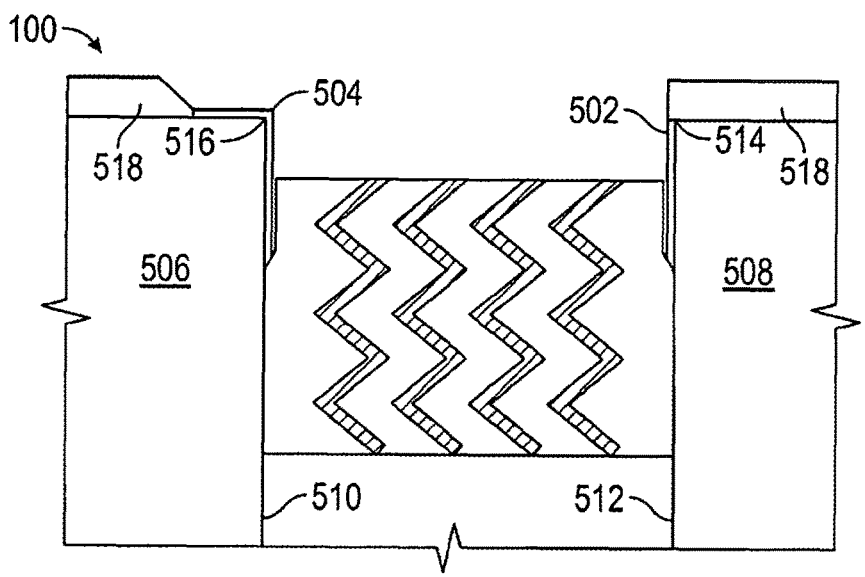
FIG. 5 illustrates an end view of another alternative expansion joint seal according to the present disclosure.

Referring to FIG. 5, an end view of another alternative expansion joint seal according to the present disclosure is provided. An external intumescent member 502, 504 may be provided in conjunction with, or as part of the fire-resistant and water-resistant expansion joint seal 100. If provided with, but not as part of the fire-resistant and water-resistant expansion joint seal 100 as provided on site, the external intumescent member 502, 504 would be provided for field installation. The external intumescent member 502, 504 abuts the face 510, 512 of the substrate 506, 508 intermediate a portion of the fire-resistant and water-resistant expansion joint seal 100 and the substrate 506, 508. As a result, the external intumescent member 502, 504 provides protective cover to the substrate 506, 508 above the top of the fire-resistant and water-resistant expansion joint seal 100, while preferably not obstructing any field application of fireproofing, such as board or spray applied substrate protection. Preferably, the external intumescent member 502, 504 provides sufficient protection to the substrates 506, 508 such the fire-resistant and water-resistant expansion joint seal 100 may pass a modified Rijkswaterstaat (RWS) test that protects against extreme initial temperature exposure within the first 12 minutes or meet the requirements of a full RWS or Underwriters Laboratories (UL) 1709 time-temperature exposure. The UL 1709 test, for example, is largely a horizontal line at a temperature of 2000° F. regardless of time.

When installed in the field, the external intumescent member 502, 504 is positioned between the fire-resistant and water-resistant expansion joint seal 100 and the substrate 506, 508 either before or after installation of the fire-resistant and water-resistant expansion joint seal 100 between the substrates 506, 508, such that it covers the face 510, 512 of the substrate 506, 508 which would otherwise be above the fire-resistant and water-resistant expansion joint seal 100 and therefore exposed. Preferably, the external intumescent member 502, 504 extends below the top 404 of the fire-resistant and water-resistant expansion joint seal 100 at least ten percent (10%) of the foam height 114.

To achieve reasonable protection of the face 510, 512 of the substrate 506, 508 which would otherwise be above the fire-resistant and water-resistant expansion joint seal 100, the exposed face 510, 512 and associated corned 514, 516, the external intumescent member 502, 504 should extend below the top 404 of the fire-resistant and water-resistant expansion joint seal 100, by at least one quarter of an inch, but preferably by a full inch. The external intumescent member 502, 504 may be a board or liquid fire retardant, such as W.R. Grace's Monokote line, or competitive products produced by Isolatek and Promat.

The external intumescent member 502, 504 may be affixed to the system at manufacture or at the time of installation. The external intumescent member 502, 504 may be affixed to the fire-resistant and water-resistant expansion joint seal 100 at manufacture, with the fire-resistant and water-resistant expansion joint seal 100 supplied in a pre-compressed state to facilitate installation. Whether at manufacture or at installation, the external intumescent member 502, 504 may be provided by applying an intumescent modified epoxy or other adhesive that is also fire resistant or of a type that will not impede its function. Alternatively, the external intumescent member 502, 504 could be formed at installation by application of a liquid or mastic having fire resistance and adhesive properties directly to the substrate 506, 508 on the corners 514, 516 and the faces 510, 512. If desired, such an application could extend as far as the full length of contact between the substrate 506, 508 and the fire-resistant and water-resistant expansion joint seal 100, and provide an adhesive function.

Because external intumescent member 502, 504 protects the face 510, 512 and the corner 514, 516 of the substrate 506, 508, it is provided in an "L" or angular shape. After the fire-resistant and water-resistant expansion joint seal 100 and external intumescent member 502, 504 are installed between the substrates 506, 508, a fire protection layer 518 may be installed over the external intumescent member 502, 504 and the substrates 506, 508. Preferably, the fire protection layer 518 extends to the face 510, 512 of the substrate 506, 508, but may stop before the external intumescent member 502, 504, to allow for project specific limitations precluding the full coverage of the exposed face. Because the external intumescent member 502, 504 is either field applied or part of the supplied foam expansion joint such that it provides exposed corner substrate protection, the need for expensive stainless steel "J" metal angles to be mechanically anchored and extend over the expansion joint for spray applied coatings at joint and other fire resistant coating terminations is eliminated.

Figure 6:
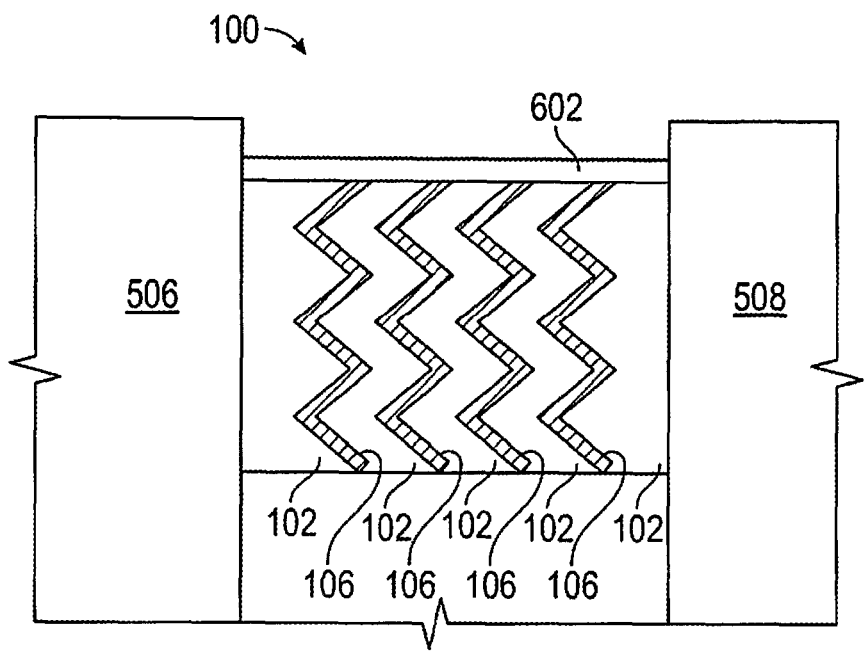
FIG. 6 illustrates an alternative embodiment including a coating according to the present disclosure.

Referring to FIG. 6, an alternative embodiment including a coating may be provided. Multiple coatings may be selected to provide further or alternative benefits to the foam member 102. The top coating 602 applied to the foam member 102 may be an elastomer coating, or intumescent coating, or an insulating coating. The top coating 602 may be a full coating of the entire top of all foam members 102, or may be only a partial coating of some or all of the foam members 102. The top coating 602 may be flexible, or may be semi-rigid, and may be selected to increase the load carrying capacity of the fire-resistant and water-resistant expansion joint seal 100.

The exposed foam top surface may be coated or partially coated with a flexible or semi-rigid elastomer to increase load carrying capability which is further enhanced by the supporting intumescent members. These, or other coatings, may be used to provide waterproofing, fire resistance, or additional functional benefits. The top coating 602 may provide a redundant sealant and may be on the side of a laminate of the foam body 102. The top coating 602 may be particularly beneficial in connection with use of a foam member 102 which is not impregnated or only slightly impregnated, so that the top coating 602 may provide a primary sealant, protecting the foam member 102 from moisture or increasing its resiliency. The top coating 602 may be a hydrophilic polymer, a flexible elastomer or antimicrobial coating.

Figure 7:
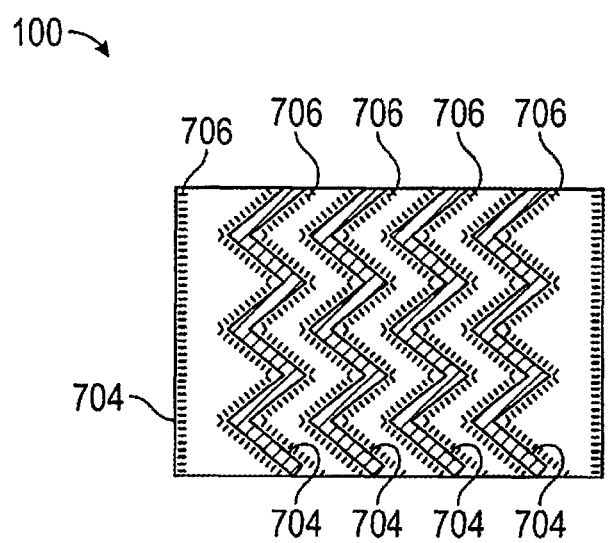
FIG. 7 illustrates an alternative embodiment including an impregnate according to the present disclosure.

Referring to FIG. 7, the fire-resistant and water-resistant expansion joint seal 100 may include at least one foam member 102 impregnated with an impregnate 706, such as a fire retardant such as aluminum trihydroxide about ten percent of the distance of the foam width 104 from the foam body first side 704. Additional function properties can be added by surface impregnating the exposed or outside surfaces of the foam as well as the inside portion if additional properties are desirable.

Figure 8:
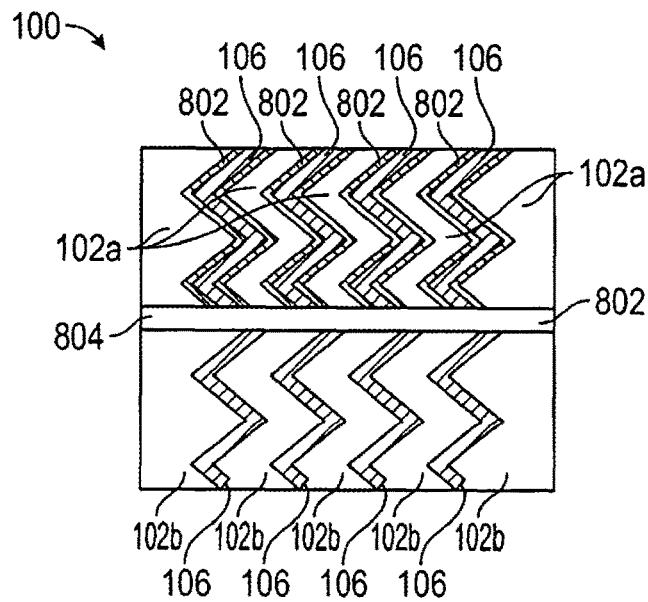
FIG. 8 illustrates an alternative embodiment including an internal barrier according to the present disclosure.

Referring to FIG. 8, an alternative embodiment of the present disclosure is provided. Because of the relative softness and ease of compressibility of medium density viscoelastic foams, they may be used in seals allowing for easy hand compression and installation at the job site. Such a seal would not require factory compression before delivery, reducing manufacturing costs and the expense of the packaging material needed to maintain compression. The foam members 102 could be formed of commercially available vapor permeable foam products or by forming specialty foams. Commercial available products which provide vapor permeable and excellent fire resistant properties are well known, such as Sealtite VP or Willseal 600. It is well known that a vapor permeable but water resistant foam joint sealant may be produced leaving at least a portion of the cell structure open while in compression such that water vapor can escape through the impregnated foam sealant. Water is then ejected on the exterior of a foam member 102 because the foam, and/or any impregnation, is hydrophobic and therefore repels water. Water can escape from the foam sealant or wall cavity through water vapor pressure by virtue of the difference in humidity creating unequal pressure between the two areas. Because the cell structure is still partially open the vapor pressure drive is sufficient to allow moisture to return to equalization or the exterior of the structure. By a combination of compression ratio and impregnation density of a hydrophobic component the water resistance capacity can be increased to provide resistance to various levels of pressure or driving rain.

The present disclosure may further incorporate a membrane, which may be vapor impermeable or vapor permeable, for further benefits. Referring to FIG. 8, the membrane 802 may be positioned between the foam members 102 adjacent the intumescent members 106 for a vertical benefit, between adjacent foam members 102, or may be horizontally imposed to section the foam members 102 into an upper foam member 102a and a separate lower foam membrane 102b. When horizontally aligned, the membrane 802 provides a barrier to foreign matter penetrating through the foam body 102 and to opposing surface of the joint, thus ensuring some portion of the foam bodies 102 are not susceptible to contaminants and therefore continues to function. As the foam members 102 may be composed of a vapor permeable foam, such a composition becomes particularly beneficial when a barrier or membrane 802 is present, such as at the bottom surface 804 of the foam members 102 and is adhered to the bottom surface 804. As a result, the foam members 102 above—and, if included, below—a membrane 802 may retain and then expel moisture, preventing moisture from penetrating in an adjacent substrate. As can be appreciated, to be effective, the membrane 802 is preferably sized to be no smaller in any dimension than the adjacent foam body 102, when adjacent, or foam bodies 102, when positioned below, but may be sized to less than the cumulative widths of the foam members 102 and intumescent members 106, to provide for compression without substantial bowing of the membrane 802. Consistent with uses known in the art, the present disclosure may be associated with a central non-conductive spine and cover plate assembly for those uses wherein high traffic is anticipated, as well as for compliance with Department of Transportation requirements.

Figure 9:
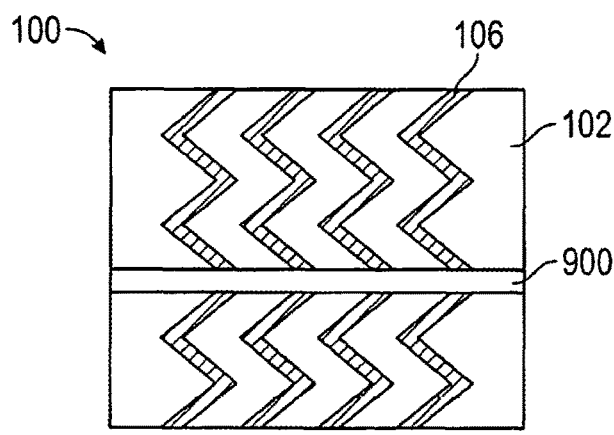
FIG. 9 illustrates an alternative embodiment including a membrane according to the present disclosure.

Referring to FIG. 9, a first fire-resistant and water-resistant expansion joint seal 100 may be overlaid with a membrane 900, over which may be positioned a second fire-resistant and water-resistant expansion joint seal, positioning the membrane 900 within the effective seal.

Figure 10:
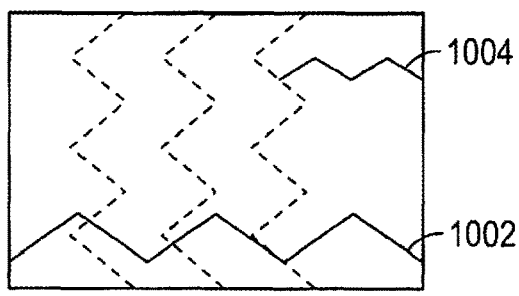
FIG. 10. illustrates an alternative embodiment including a membrane according to the present disclosure.

Moreover, as illustrated in FIG. 10, the intumescent members 106 may alternatively be positioned to provide a spring force on a plane non-parallel to the face of the substrates, resulting in lateral forces being unequally distributed into the foam member 102, and discouraging or offsetting any compression set. Forces downwardly applied to the fire-resistant and water-resistant expansion joint seal 100 are not only transferred to the foam member 102, which readily compresses, but also the interspersed intumescent members 106, which compresses in response to the loading in light of its own spring force. When compressed, the intumescent members 106 transfer the load laterally into the foam member 102. The intumescent members 106 therefore support downward loads by compressive support. This positioning may be accomplished, for example by providing a second fire-resistant and water-resistant expansion joint seal 100, such as illustrated in FIGS. 8 and 9, but aligned at a right angle, or by interposing intumescent members 1002 at a right angle between those longitudinally positioned between the foam members 102, or by simply positioning a short intumescent member 1004 in the external foam member 102.

Intumescent members 106 may have an intumescent length 204 shorter than the foam length 202, and a plurality of separate intumescent members 106 may be sequentially positioned along the foam 102 to be nearly equivalent to the foam length 202. Separate, shorter intumescent members 106 may be beneficial in avoiding any propagation of a failure of the resiliency of any one intumescent member 106.

The fire-resistant and water-resistant expansion joint seal 100 disclosed herein, in its various embodiments, thus provides a water and fire resistant joint sealant that passes all of the testing requirements of UL2079-2008 including passing or meeting the fire endurance requirements for horizontal and vertical joints, meeting the requirements for all movement and cycling classifications, passing the vertical wall hose stream component and achieve the UL 2079 air and water resistance ratings, including passing Section 9.6 Movement Cycling (any one of the three regimes), and Section 11 Fire Endurance.

Thus, for the joint seal 100, a bottom surface temperature of a bottom 124 of the plurality of foam members 102 at a maximum joint width 126 increases no more than 181° C. after sixty minutes when the joint seal 100 is exposed to heating according to the equation $T=20+345*LOG(8*t+1)$, where t is time in minutes and T is temperature in C. The joint seal 100, wherein the plurality of foam members 102 have a maximum joint width 126 of more than six (6) inches and a bottom surface temperature of a bottom 124 of the plurality of foam members 102 increases no more than 139° C. after sixty minutes when the joint seal 100 is exposed to heating according to the equation T=20+345*LOG(8*t+1), where t is time in minutes and T is temperature in C. The joint seal 100 is adapted to be cycled one of 500 times at 1 cycle per minute, 500 times at 10 cycles per minute and 100 cycles at 30 times per minute, without indication of stress, deformation or fatigue.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

What is claimed is:

1. A fire-resistant and water-resistant expansion joint seal comprising:
    a plurality of foam members,
    a plurality of intumescent members,
    each of the plurality of intumescent members having a lateral cross section, each of the lateral cross sections presenting a wave-like profile;
    each of the plurality of intumescent members having an intumescent member spring force;
    each of the plurality of intumescent members interspersed between two of the plurality of foam members; and
    an external intumescent member adjacent only one of the plurality of foam members on a first side near a top of the one of the plurality of foam members.

2. The joint seal of claim 1, wherein each of the plurality of foam members is selected from one of the group of a rectangular prism and a shape complementary to the wave-like profile.

3. The joint seal of claim 2, wherein at least one of the plurality of foam members is vapor permeable.

4. The joint seal of claim 2, wherein the fire-resistant and water-resistant expansion joint seal meets the requirements of the Rijkswaterstaat test standard.

5. The joint seal of claim 1, wherein the spring force is parallel to the vertical axis of the joint seal.

6. The joint seal of claim 1, wherein the spring force is non-parallel to the vertical axis of the joint seal.

7. The joint seal of claim 1, wherein each of the plurality of intumescent members presents a common wave-like profile.

8. The joint seal of claim 1, wherein one of the plurality of intumescent members presents a wave-like profile dissimilar to at least one of the adjacent each of the plurality of intumescent members.

9. The joint seal of claim 1, wherein the wave-like profile of one of the plurality of intumescent members is selected from at least one of the group of a triangular wave, a sine wave, a square wave, a sawtooth wave and an irregular wave.

10. The joint seal of claim 1, wherein a foam width of the plurality of foam members is smaller at a center of the joint seal than at an end of the joint seal.

11. The joint seal of claim 1, further comprising:
    a top coating applied to a top of the plurality of foam members selected from at least one of the group of an elastomer coating, an intumescent coating, an insulating coating, a hydrophilic coating, and an antimicrobial coating.

12. The joint seal of claim 11 wherein the top coating is hydrophilic.

13. The joint seal of claim 1, further comprising:
    a primer, the primer applied between each of the plurality of foam members and each of the plurality of intumescent members.

14. The joint seal of claim 1, wherein each of the plurality of foam members includes at least one of a fire retardant additive and a water resistance additive.

15. The joint seal of claim 1, wherein one of the plurality of foam members is composed of a foam selected from a viscoelastic foam, a closed cell foam, and a partially closed foam.

16. The joint seal of claim 15, further comprising an adhesive between the viscoelastic foam and the adjacent plurality of intumescent members.

17. The joint seal of claim 1, wherein one of the plurality of foam members has a mechanical property or composition different from the balance of the plurality of foam members.

18. The joint seal of claim 1, further comprising a primer between the viscoelastic foam and the adjacent plurality of intumescent members.

19. The joint seal of claim 18, further comprising a fire resistant layer across a top of the plurality of foam members.

20. The joint seal of claim 1, wherein one of the plurality of foam members is hydrophilic.

21. The joint seal of claim 1, wherein one of the plurality of intumescent members is hydrophilic.

22. The joint seal of claim 1, wherein one of the plurality of foam members includes a hydrophilic compound uniformly distributed throughout.

23. The joint seal of claim 1, wherein each of the plurality of foam members has a foam first side and wherein at least one of the plurality of foam members is impregnated throughout about ten percent of a distance of a foam width from the foam first side.

24. The joint seal of claim 1, further comprising a vapor-impermeable membrane positioned intermediate one of the plurality of foam members and one of the plurality of intumescent members.

25. The joint seal of claim 1, wherein each of the plurality of foam members has a bottom surface and further comprising a vapor impermeable membrane adhered to the bottom surface of at least one of the plurality of foam members.

26. The joint seal of claim 1, further comprising:
    each of the plurality of foam members having a foam height;
    the shortest of the plurality of intumescent members having an intumescent member height; and
    the intumescent member height of each intumescent member being less than the foam height of each of the plurality of foam members adjacent thereto.

27. The joint seal of claim 1, further comprising:
    each of the plurality of foam members having a foam height;
    the shortest of the plurality of intumescent members having an intumescent member height;
    the intumescent member height of each intumescent member being greater than the foam height of each of the plurality of foam members adjacent thereto.

28. The joint seal of claim 1, wherein a bottom surface temperature of a bottom of the plurality of foam members at a maximum joint width increases no more than 181° C. after sixty minutes when the joint seal is exposed to heating according to the equation T=20+345*LOG(8*t+1), where t is time in minutes and T is temperature in C.

29. The joint seal of claim 28, wherein the joint seal is adapted to be cycled one of 500 times at 1 cycle per minute, 500 times at 10 cycles per minute and 100 cycles at 30 times per minute, without indication of stress, deformation or fatigue.

30. The joint seal of claim 1, wherein the plurality of foam members having a maximum joint width of more than six (6) inches and a bottom surface temperature of a bottom of the plurality of foam members increases no more than 139° C. after sixty minutes when the joint seal is exposed to heating according to the equation T=20+345*LOG(8*t+1), where t is time in minutes and T is temperature in C.

31. A fire-resistant and water-resistant expansion joint seal (100), comprising:
   a foam member,
      the foam member having a foam height;
   a plurality of intumescent members,
   each of the plurality of intumescent members having a lateral cross section, the lateral cross section presenting a wave-like profile,
      each of the plurality of intumescent members having an intumescent member height, the foam height being not less than the intumescent member height,
      each of the plurality of intumescent members having an intumescent member spring force;
      each of the plurality of intumescent members interspersed within the foam member;
      each of the plurality of intumescent members adhered to the foam member; and
   an external intumescent member adjacent only one of the plurality of foam members on a first side near a top of the one of the plurality of foam members.

32. A fire-resistant and water-resistant expansion joint seal, comprising:
   a first plurality of foam members,
   a first plurality of intumescent members,
   each of the first plurality of intumescent members having a lateral cross section, each of the lateral cross sections of the first plurality of intumescent members presenting a wave-like profile;
   each of the first plurality of intumescent members having a first intumescent member spring force;
   each of the first plurality of intumescent members interspersed between two of the first plurality of foam members,
   a second plurality of foam members,
   a second plurality of intumescent members,
   each of the second plurality of intumescent members having a lateral cross section, each of the lateral cross sections of the second plurality of intumescent members presenting a wave-like profile;
   each of the second plurality of intumescent members having a second intumescent member spring force;
   each of the second plurality of intumescent members interspersed between two of the second plurality of foam members;
   a vapor-impermeable membrane, the vapor-impermeable membrane adhered to a bottom of the first plurality of foam members and the vapor-impermeable membrane adhered to a top of the second plurality of foam members; and
   an external intumescent member adjacent only one of the plurality of foam members on a first side near a top of the one of the plurality of foam members.

* * * * *